(12) United States Patent
Suemitsu et al.

(10) Patent No.: US 12,281,863 B2
(45) Date of Patent: Apr. 22, 2025

(54) RADIATIVE COOLING DEVICE

(71) Applicant: Osaka Gas Co., Ltd., Osaka (JP)

(72) Inventors: Masahiro Suemitsu, Osaka (JP); Tadashi Saito, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 1163 days.

(21) Appl. No.: 16/971,602

(22) PCT Filed: Jan. 17, 2019

(86) PCT No.: PCT/JP2019/001338
§ 371 (c)(1),
(2) Date: Aug. 20, 2020

(87) PCT Pub. No.: WO2019/163340
PCT Pub. Date: Aug. 29, 2019

(65) Prior Publication Data
US 2020/0400391 A1  Dec. 24, 2020

(30) Foreign Application Priority Data
Feb. 22, 2018 (JP) .................. 2018-029964

(51) Int. Cl.
*F28F 21/08* (2006.01)
*B32B 15/04* (2006.01)
(Continued)

(52) U.S. Cl.
CPC .......... *F28F 21/081* (2013.01); *B32B 15/043* (2013.01); *B32B 17/061* (2013.01); *G02B 5/26* (2013.01)

(58) Field of Classification Search
CPC .... F28F 21/081; B32B 15/043; B32B 17/061; G02B 5/26
See application file for complete search history.

(56) References Cited

U.S. PATENT DOCUMENTS 3,813,541 A * 5/1974 Foss ..................... H01L 31/1133
257/225
3,990,784 A * 11/1976 Gelber ..................... G02B 1/10
427/160
(Continued)

FOREIGN PATENT DOCUMENTS

CN  103045882 A *  4/2013
CN  103794665 A †  5/2014
(Continued)

OTHER PUBLICATIONS

Fujito et al., Sputtering Target and Manufacturing Method, Oct. 9, 2002, JP2002294440A, Whole Document (Year: 2002).*
(Continued)

*Primary Examiner* — Larry L Furdge
(74) *Attorney, Agent, or Firm* — The Webb Law Firm

(57) ABSTRACT

A radiative cooling device in which an infrared radiative layer for radiating infrared light from a radiative surface and a light reflective layer disposed on a side opposite the radiative surface of the infrared radiative layer are provided in a mutually stacked state. The light reflective layer includes a first layer made of silver or silver alloy, a second layer made of aluminum or aluminum alloy and an anti-alloying transparent layer for preventing alloying between silver and aluminum are stacked in the order of the first layer, the anti-alloying transparent layer and the second layer with the first layer closest to the infrared radiative layer.

12 Claims, 16 Drawing Sheets

(51) Int. Cl.
  *B32B 17/06* (2006.01)
  *G02B 5/26* (2006.01)

(56) References Cited

U.S. PATENT DOCUMENTS

| | | | | |
|---|---|---|---|---|
| 5,019,458 | A | * | 5/1991 | Elgat .................. C03C 17/3618 |
| | | | | 428/673 |
| 5,904,989 | A | * | 5/1999 | Hanggi .................. C25D 11/04 |
| | | | | 428/457 |
| 6,587,263 | B1 | † | 7/2003 | Iacovangelo |
| 9,134,467 | B2 | | 9/2015 | Krasnov et al. |
| 10,126,020 | B2 | † | 11/2018 | Villuendas Yuste |
| 2005/0079390 | A1 | | 4/2005 | Habuta et al. |
| 2009/0195865 | A1 | † | 8/2009 | Kleideiter |
| 2015/0171235 | A1 | * | 6/2015 | Jost ........................ H01L 31/18 |
| | | | | 438/57 |
| 2015/0338175 | A1 | * | 11/2015 | Raman .................. F24F 5/0092 |
| | | | | 165/185 |
| 2016/0155989 | A1 | | 6/2016 | To et al. |

FOREIGN PATENT DOCUMENTS

| | | | |
|---|---|---|---|
| CN | 104459848 | A † | 3/2015 |
| JP | 71794917 | A | 7/1995 |
| JP | 2002294440 | A * | 10/2002 |
| JP | 2005276402 | A | 10/2005 |
| JP | 2014120487 | A | 6/2014 |
| JP | 201518770 | A | 1/2015 |
| WO | 2014078223 | A1 | 5/2014 |
| WO | 2016/205717 | A1 † | 12/2016 |
| WO | 2017/151514 | A1 † | 9/2017 |

OTHER PUBLICATIONS

Hong et al., Method for Preparing aluminum-praseodymium intermediate alloy . . . , Apr. 17, 2013, CN103045882A, Whole Document (Year: 2013).*

Sakata, Recent Progress in Glass Surface Treatments—Improvement in Mechanical and Optical Properties, Journal of the Ceramic Society of Japan, Aug. 30, 1978, pp. 19-27, 88(12).

Davis, "Aluminum and Aluminum Alloys", Alloying: Understanding the Basics, 2001, p. 351-416.

\* cited by examiner
† cited by third party

Fig.3
| thickness of $Si_3N_4$ | cooling capacity |
|---|---|
| 0 nm | 68.5 W/m² |
| 34 nm | 65.6 W/m² |
| 47 nm | 55.9 W/m² |
| 100 nm | 42.0 W/m² |
Fig.4
| thickness of $Al_2O_3$ | cooling capacity |
|---|---|
| 0 nm | 68.5 W/m² |
| 44 nm | 67.6 W/m² |
| 60 nm | 58.2 W/m² |
| 100 nm | 40.3 W/m² |
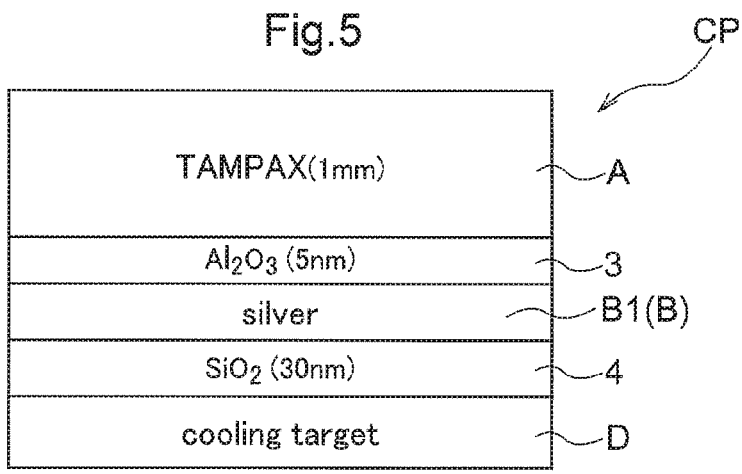
Fig.5
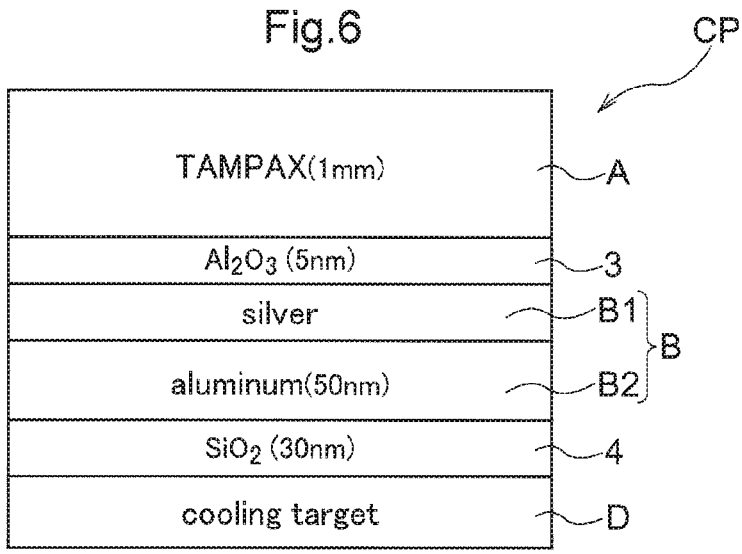
Fig.6

Fig.7

| thickness of silver | silver alone | silver + aluminum |
|---|---|---|
| 300 nm | 68.7 W/m² | 68.7 W/m² |
| 100 nm | 65.7 W/m² | 69.0 W/m² |
| 90 nm | 64.4 W/m² | 69.2 W/m² |
| 80 nm | 62.2 W/m² | 69.3 W/m² |
| 70 nm | 58.3 W/m² | 69.3 W/m² |
| 60 nm | 51.4 W/m² | 69.2 W/m² |
| 50 nm | 38.4 W/m² | 68.5 W/m² |
| 40 nm | 13.5 W/m² | 66.5 W/m² |
| 30 nm | −175.6 W/m² | 61.5 W/m² |
| 20 nm | −36.5 W/m² | 49.7 W/m² |
| 10 nm | −396.3 W/m² | 25.5 W/m² |
| 5 nm | −648.9 W/m² | 7.1 W/m² |
| 3.3 nm | −759.8 W/m² | 0.0 W/m² |
| 1 nm | −901.8 W/m² | −10.1 W/m² |
| 0 nm | −931.3 W/m² | −14.7 W/m² | positive cooling negative heating

Fig.22

| membrane thickness of silver | crossing wavelength with reflectance of 200 nm aluminum |
|---|---|
| 200 nm | 380 nm |
| 100 nm | 390 nm |
| 60 nm | 440 nm |
| 50 nm | 470 nm |
| 40 nm | 540 nm |
| 30 nm | 680 nm |
| 20 nm | 820 nm |

RADIATIVE COOLING DEVICE

CROSS-REFERENCE TO RELATED APPLICATIONS

This application is the United States national phase of International Application No. PCT/JP2019/001338 filed Jan. 17, 2019, and claims priority to Japanese Patent Application No. 2018-029964 filed Feb. 22, 2018, the disclosures of which are hereby incorporated by reference in their entirety.

TECHNICAL FIELD

The present invention relates to a radiative cooling device configured such that an infrared radiative layer for radiating infrared light from a radiative surface and a light reflective layer disposed on the opposite side to the presence side of the radiative surface of the infrared radiative layer are provided in a mutually stacked state.

BACKGROUND ART

Such radiative cooling device is provided for use in cooling various kinds of cooling targets or objects, with an arrangement e.g. that infrared light (radiation) radiated from the radiative surface of the infrared radiative layer is transmitted through the atmospheric window (e.g. a window that allows transmission therethrough of infrared light having wavelengths ranging from 8 to 13 µm), thereby to cool a cooling target (a target or an object to be cooled) located on the side of the light reflective layer opposite to the presence side of the infrared radiative layer.

By the way, the light reflective layer reflects the light (visible light, ultraviolet light, infrared light) transmitted through the infrared radiative layer from the radiative surface, thus preventing such light (visible light, ultraviolet light, infrared light) transmitted through the infrared radiative layer from being projected onto the cooling target to heat this cooling target.

Incidentally, the light reflective layer has a further function of reflecting not only the light transmitted through the infrared radiative layer, but also the infrared light radiated from the infrared radiative layer to the presence side of the light reflective layer back toward the infrared radiative layer. However, the following explanation will be made on a premise that the light reflective layer is provided for the purpose of reflecting the light (visible light, ultraviolet light, infrared light) transmitted through the infrared radiative layer.

As a first conventional example of such radiative cooling device, there is known one configured such that its light reflective layer comprises a metal layer formed of silver and a photon bandgap layer which is provided as a multilayered assembly of a titanium dioxide ($TiO_2$) layer and a magnesium fluoride ($MgF_2$) layer disposed in alternation, the metal layer and the photon bandgap layer being stacked, with the photo bandgap layer being disposed on the side close to the infrared radiative layer (see e.g. International Publication No. 2014/078223).

As a second conventional example of such radiative cooling device, there is known one configured such that its light reflective layer comprises a metal layer formed of aluminum (see e.g. Japanese Unexamined Patent Application Publication: Hei. 7-174917).

Incidentally, in Patent Document 2, the metal layer formed of aluminum is used as a substrate, on which an SiO layer and an MgO layer together constituting an infrared radiative layer are stacked.

SUMMARY OF THE INVENTION

In the case of the first conventional example, since the light reflective layer includes a photon bandgap layer in the form of a multi-layered stacked assembly, there was a disadvantage of the manufacture being troublesome. Moreover, if such photon bandgap layer is to be provided, as it is difficult to form the metal layer made of silver sufficiently thin, the arrangement will suffer a disadvantage of cost reduction of the entire arrangement being difficult.

In the case of the second conventional example, its light reflective layer is comprised of a metal layer made of aluminum. Thus, as the light reflective layer is made of aluminum which is inexpensive, cost reduction of the general arrangement is possible.

However, since the metal layer made of aluminum is more absorptive to light than silver, the light transmitted through the infrared radiative layer will be absorbed in the metal layer made of aluminum, so that due to e.g. heating of the cooling target by the metal layer which is heated by this absorption of light, appropriate cooling of the cooling target may not be possible.

In view of the above-described state of the art, the present inventors have conducted extensive and intensive study, according to which it was discovered that if the light reflective layer is constituted of a metal layer made of silver having a thickness equal to or greater than 100 nm, cooling of a cooling target is possible with effective suppression of projection of light transmitted through the infrared radiative layer onto the cooling target (see FIG. 12 and FIG. 13) and that if the light reflective layer is constituted of a metal layer made of silver having a thickness equal to or greater than 300 nm, appropriate cooling of a cooling target is possible with reliable suppression of projection of light transmitted through the infrared radiative layer onto the cooling target.

Notwithstanding the above, silver is an expensive metal. Thus, if the light reflective layer is constituted of a metal layer made of silver having a thickness equal to or greater than 300 nm, this will make the radiative cooling device expensive. Thus, there has been a need to cool a cooling target with maximum saving of the amount of silver to be used.

The present invention has been made in view of the above and its object is to provide a radiative cooling device that can cool a cooling target appropriately with cost reduction of its light reflective layer and that also can achieve the cooling effect for an extended period of time advantageously.

According to the present invention, there is provided a radiative cooling device configured such that an infrared radiative layer for radiating infrared light from a radiative surface and a light reflective layer disposed on the opposite side to the presence side of the radiative surface of the infrared radiative layer are provided in a mutually stacked state, the radiative cooling device being characterized in that:

the light reflective layer is arranged such that a first layer made of silver or silver alloy, a second layer made of aluminum or aluminum alloy and an anti-alloying transparent layer for preventing alloying between silver and aluminum are stacked in the order of the first layer, the anti-alloying transparent layer and the second layer on the side closer to the infrared radiative layer.

Namely, according to the extensive and intensive research made by the present inventors, it has been discovered that if the light reflective layer is arranged such that a first layer made of silver or silver alloy and a second layer made of aluminum or aluminum alloy are stacked with the first layer being positioned on the side closer to the infrared radiative layer, it becomes possible to cool a cooling target while suppressing the amount of expensive silver or silver alloy to be used.

More particularly, silver or silver alloy is advantageous for its capacity to reflect visible light and/or infrared light efficiently, but disadvantageous for its ultraviolet light reflectance tending to be low.

On the other hand, aluminum or aluminum alloy is not able to reflect visible light and/or infrared light efficiently in comparison with silver or silver alloy, but advantageous for its tendency to reflect ultraviolet light efficiently.

Moreover, aluminum or aluminum alloy, in comparison with silver or silver alloy, has a tendency of easily absorbing visible light and/or infrared light.

Then, it has been found that by stacking a first layer made of silver or silver alloy and a second layer made of aluminum or aluminum alloy with disposing the first layer on the side close to the infrared radiative layer, the first layer reflects the visible light or infrared light to suppress absorption of the visible light and/or infrared light by the second layer, and moreover, even if the thickness of the first layer is reduced, thanks to the existence of the first layer and the second layer, the light (visible light, ultraviolet light, infrared light) transmitted through the infrared radiative layer can be reflected appropriately, so that the cooling target can be cooled.

And, since the first layer made of silver or silver alloy can be formed thin, cost reduction of the light reflective layer is made possible.

Further, since an anti-alloying transparent layer for preventing alloying between silver and aluminum is provided between the first layer and the second layer, alloying of silver and aluminum can be suppressed. Thus, it becomes possible to achieve the cooling effect for a longer period of time by maintaining the condition of the light being reflected by the light reflective layer for a long period of time while avoiding absorption of the light by the light reflective layer.

Namely, with continuation of the condition of the silver or silver alloy of the first layer and aluminum or aluminum alloy of the second layer being kept in contact with each other, after lapse of a long period of time, alloying will progressively develop between silver and aluminum. As a result, it is anticipated that the reflectance of the light reflective layer for the solar light will deteriorate and solar light absorption thereby will increase. Thus, by providing an anti-alloying transparent layer between the first layer and the second layer in order to prevent alloying between silver and aluminum, alloying between silver and aluminum is suppressed.

In short, with the radiative cooling device according to the present invention, a cooling target can be cooled with cost reduction of its light reflective layer. Moreover, the cooling effect can be maintained for a long period of time advantageously.

According to a further characterizing feature of the radiative cooling device of the present invention, the first layer has a thickness greater than 3.3 nm and equal to or less than 100 nm.

Namely, it has been found that even if the thickness of the first layer made of silver or silvery alloy is varied in the range greater than 3.3 nm and equal to or less than 100 nm, thanks to the presence of the second layer, the light (visible light, ultraviolet light, infrared light) transmitted through the infrared radiative layer can still be reflected appropriately, thus being able to cool the cooling target.

That is, by setting the thickness of the first layer made of silver or silver alloy greater than 3.3 nm and equal to or less than 100 nm, cooling of the cooling target is possible with sufficient reduction in the cost of the light reflective layer.

More particularly, if the thickness of the first layer made of silver or silver alloy is set greater than 30 nm, within the range greater than 3.3 nm and equal to or less than 100 nm, it becomes possible to cool the cooling target appropriately.

In short, according to the further characterizing feature of the radiative cooling device of the present invention, cooling of the cooling target is possible with sufficient reduction in the cost of the light reflective layer.

According to a still further characterizing feature of the radiative cooling device of the present invention, the thickness of the first layer is equal to or greater than 50 nm and equal to or less than 100 nm.

That is, it has been found that by setting the thickness of the first layer made of silver or silver alloy equal to or greater than 50 nm and equal to or less than 100 nm, while the reflective function for the light (mainly, visible light, infrared light) by the first layer is allowed to be achieved appropriately, thanks to the presence of the second layer, the light (visible light, ultraviolet light, infrared light) transmitted through the infrared radiative layer can be reflected appropriately, as a result of which the cooling target can be cooled by a capacity equivalent to that of constituting the light reflective layer of a metal layer made of silver and having a thickness equal to or greater than 300 nm.

Therefore, while achieving cost reduction of the light reflective layer through reduction of the thickness of the first layer, cooling capacity equivalent to that of the case of constituting the light reflective layer of a metal layer made of silver and having a thickness equal to or greater than 300 nm can be obtained.

In short, according to the still further characterizing feature of the present invention, high cooling capacity can be obtained while achieving cost reduction of the light reflective layer.

According to a still further characterizing feature of the radiative cooling device of the present invention, the second layer has a thickness equal to or greater than 10 nm.

Namely, it has been found that in case the light reflective layer is to be constituted of a first layer and a second layer, if the thickness of the second layer made of aluminum or aluminum alloy is equal to or greater than 10 nm, while the function of the second layer for reflecting ultraviolet light is allowed to be achieved appropriately, thanks to the combination with the first layer, the light (visible light, ultraviolet light, infrared light) transmitted through the infrared radiative layer can be reflected appropriately.

Incidentally, the thickness of the second layer made of aluminum or aluminum alloy may be any thickness as long as it is equal to or greater than 10 nm. However, in order to suppress the amount of aluminum or aluminum alloy to be used, it is necessary to avoid increasing the thickness more than necessary.

In short, according to the still further characterizing feature of the radiative cooling device of the present invention, while the function of the second layer for reflecting ultraviolet light is allowed to be achieved appropriately, the light transmitted through the infrared radiative layer can be reflected appropriately.

According to a still further characterizing feature of the radiative cooling device of the present invention, the infrared radiative layer comprises glass selected from the group consisting of alkali free glass, crown glass and borosilicate glass.

Namely, alkali free glass, crown glass and borosilicate glass are relatively inexpensive, yet being superior in the transmittance of solar light (visible light, ultraviolet light, near infrared light) (i.e. transmitting about 80% thereof). So, they do not absorb solar light and also have the property of high light radiation intensity of radiating infrared light having wavelengths corresponding to the atmospheric window (e.g. window that transmits infrared light having a wavelength ranging from 8 to 13 μm).

Therefore, by constituting the infrared radiative layer of any glass selected from the group consisting of alkali free glass, crown glass and borosilicate glass, it is possible to obtain a radiative cooling device having high cooling capacity while achieving cost reduction in the general arrangement.

In short, according to the still further characterizing feature of the radiative cooling device of the present invention, it is possible to obtain improvement in the cooling capacity while achieving cost reduction in the general arrangement.

According to a still further characterizing feature of the radiative cooling device of the present invention, the infrared radiative layer is used as a substrate, on which the first layer, the anti-alloying transparent layer and the second layer are stacked.

Namely, since the infrared radiative layer is used as a substrate and the first layer, the anti-alloying transparent layer and the second layer are stacked on this substrate, it is possible to achieve thickness reduction of the general arrangement while achieving simplification of the general arrangement.

Incidentally, in case the first layer, the anti-alloying transparent layer and the second layer are to be stacked on the infrared radiative layer as a substrate, if the first layer, the anti-alloying transparent layer and the second layer are thin, the first layer, the anti-alloying transparent layer and the second layer will be stacked one after another by the sputtering technique or the like.

Namely, in comparison with an arrangement in which a substrate for stacking is provided separately and on this stacking substate, the second layer, the anti-alloying transparent layer and the first layer are stacked one after another by e.g. the sputtering technique or the like, after which at the portion of the first layer on the opposite side to the presence side of the anti-alloying transparent layer, an infrared radiative layer separately fabricated will be placed to be stacked thereon or in which the infrared radiative layer is stacked by the sputtering technique or the like at the portion of the first layer on the opposite side to the presence side of the anti-alloying transparent layer, there is no need to provide a stacking substrate. Consequently, it is possible to achieve simplification of the general arrangement and also to achieve membrane thickness reduction of the general arrangement.

In short, according to the still further characterizing feature of the radiative cooling device of the present invention, it is possible to achieve simplification of the general arrangement and also to achieve membrane thickness reduction in the general arrangement.

According to a still further characterizing feature of the radiative cooling device of the present invention, a gapless contact layer is stacked between the infrared radiative layer and the first layer.

Namely, since a gapless contact layer is stacked between the infrared radiative layer and the first layer of the light reflective layer, it is possible to suppress occurrence of damage such as peeling-off of the first layer of the light reflective layer from the infrared radiative layer due to e.g. temperature change, etc. Thus, durability can be improved.

In short, according to the still further characterizing feature of the radiative cooling device of the present invention, durability can be improved.

According to a still further characterizing feature of the radiative cooling device of the present invention, on the side of the second layer opposite to the presence side of the anti-alloying transparent layer, an anti-oxidization layer is stacked.

Namely, on the side of the second layer made of aluminum or aluminum alloy opposite to the presence side of the anti-alloying transparent layer, an anti-oxidization layer is stacked. Therefore, even if the second layer is formed thin, oxidization deterioration of the second layer can be suppressed, so that the durability can be improved.

In short, according to the still further characterizing feature of the radiative cooling device of the present invention, deterioration of the second layer made of aluminum or aluminum alloy can be suppressed, whereby the durability can be improved.

According to a still further characterizing feature of the radiative cooling device of the present invention, the anti-alloying transparent layer comprises a transparent nitride membrane.

Namely, by providing a transparent nitride membrane as the anti-alloying transparent layer, alloying between silver or silver alloy of the first layer and aluminum or aluminum alloy of the second layer can be appropriately suppressed.

Incidentally, as some specific examples of such transparent nitride membrane, $Si_3N_4$, AlN can be cited.

By the way, such transparent nitride membrane provides a further advantage of facilitating productivity improvement since no discoloration occurs in silver or silver alloy of the first layer when the membrane is formed by such technique as sputtering, vapor deposition, etc.

In short, according to the still further characterizing feature of the present invention, alloying between silver and aluminum can be suppressed appropriately.

According to a still further characterizing feature of the radiative cooling device of the present invention, the anti-alloying transparent layer comprises a transparent oxide membrane.

Namely, by providing a transparent oxide membrane as the anti-alloying transparent layer, alloying between silver or silver alloy of the first layer and aluminum or aluminum alloy of the second layer can be appropriately suppressed.

Incidentally, as some specific examples of such transparent oxide membrane, various kinds may be employed. As one specific example, $Al_2O_3$, $SiO_2$, $TiO_2$, $ZrO_2$, $HfO_2$, $Nb_2O_5$, or $Ta_2O_5$ which can be readily formed into membranes by the sputtering technique or the like can be cited.

In short, according to the still further characterizing feature of the present invention, alloying between silver and aluminum can be suppressed appropriately.

According to a still further characterizing feature of the present invention, the ani-alloying transparent layer has a thickness providing, as a resonant wavelength, any wavelength of the wavelengths equal to or less than 400 nm.

Namely, although the anti-alloying transparent layer absorbs light, by setting the thickness of this anti-alloying transparent layer to such a thickness that provides any wavelength of the wavelengths equal to or less than 400 nm as the resonance wavelength, the light absorption amount of the light reflective layer as a whole is suppressed.

Namely, the solar light spectrum is present generally in the range from 300 to 4000 nm, and on the long wavelength side longer than 400 nm, the solar light intensity (light energy) is high. Whereas, the light in the ultraviolet radiation range from 300 to 400 nm corresponds to the "tail" of the solar light spectrum, thus its energy is not high.

Therefore, even if the anti-alloying transparent layer absorbs light, by the arrangement of causing it to absorb the light on the short wavelength side shorter than 400 nm, the light absorption amount of the light reflective layer as a whole can be suppressed.

In short, according to the still further characterizing feature of the present invention, the light absorption amount of the light reflective layer as a whole can be suppressed.

According to a still further characterizing feature of the present invention, the ani-alloying transparent layer has a thickness providing, as a resonant wavelength, any wavelength of the wavelengths equal to or less than 300 nm.

Namely, although the anti-alloying transparent layer absorbs light, by setting the thickness of this anti-alloying transparent layer to such a thickness that provides any wavelength of the wavelengths equal to or less than 300 nm as the resonance wavelength, the light absorption amount of the light reflective layer as a whole is suppressed.

Namely, the solar light spectrum is present generally in the range from 300 to 4000 nm, and on the long wavelength side longer than 400 nm, the solar light intensity (light energy) is high. Whereas, the light in the ultraviolet radiation range from 300 to 400 nm corresponds to the "tail" of the solar light spectrum, thus its energy is not high. Moreover, the shorter the wavelength side, the smaller the energy. Thus, when equal to or less than 300 nm, the energy is sufficiently small.

Therefore, even if the anti-alloying transparent layer absorbs light, by the arrangement of causing it to absorb the light on the short wavelength side shorter than 300 nm, the light absorption amount of the light reflective layer as a whole can be suppressed.

In short, according to the still further characterizing feature of the present invention, the light absorption amount of the light reflective layer as a whole can be suppressed.

BRIEF DESCRIPTION OF THE DRAWINGS

FIG. 3 is a table showing cooling capacity of the radiative cooling device, FIG. 4 is a table showing cooling capacity of the radiative cooling device, FIG. 5 is a view showing an arrangement of a radiative cooling device according to a comparison arrangement, FIG. 6 is a view showing an arrangement of a radiative cooling device of a basic arrangement, FIG. 7 is a table showing cooling capacity of the radiative cooling device of the basic arrangement, FIG. 22 is a table showing wavelengths where the reflectance of silver is lower than the reflectance of aluminum.

DESCRIPTION OF THE INVENTION

Next, an embodiment of the present invention will be explained with reference to the accompanying drawings.

Arrangement of Radiative Cooling Device

Figure 1:
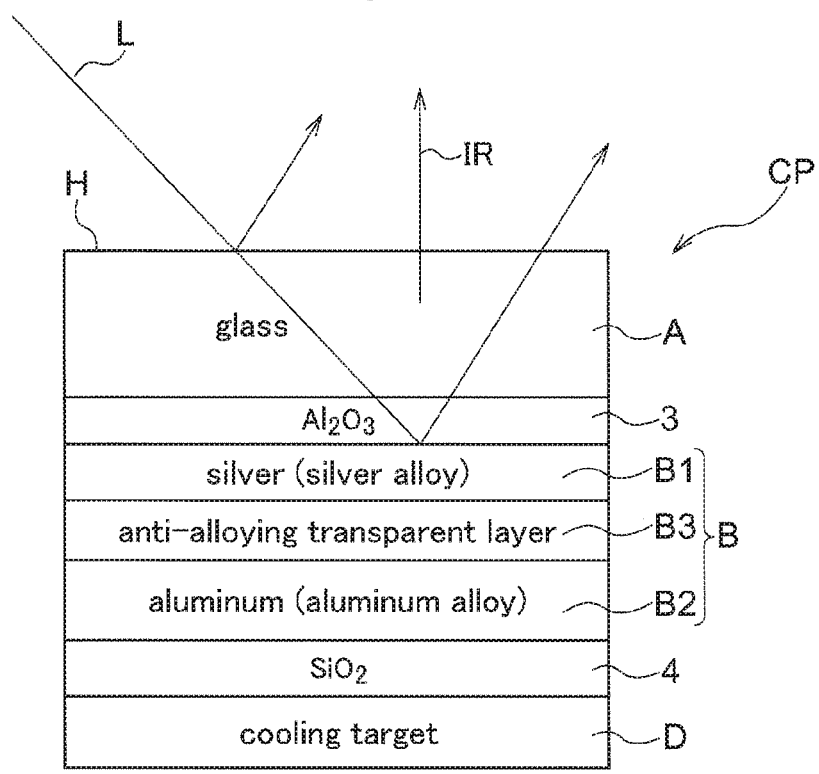
FIG. 1 is a view showing an arrangement of a radiative cooling device.

As shown in FIG. 1, a radiative cooling device CP includes an infrared radiative layer A for radiating infrared light (infrared radiation) IR from a radiative surface H thereof and a light reflective layer B disposed on the opposite to the presence side of the radiative surface H of the infrared radiative layer A in a mutually stacked state.

The light reflective layer B includes a first layer B1 made of silver or silver alloy, a second layer B2 made of aluminum or aluminum alloy (to be referred to simply as "aluminum" hereinafter) and an anti-alloying transparent layer B3 for preventing alloying between silver and aluminum, stacked in the order of the first layer B1, the anti-alloying transparent layer B3 and the second layer B2 from the side closer to the infrared radiative layer A.

The first layer B1 has a thickness (membrane thickness) greater than 3.3 nm and equal to or less than 100 nm. Preferably, the thickness (membrane thickness) of the first layer B1 is set to be equal to or greater than 50 nm and equal to or less than 100 nm.

The thickness (membrane thickness) of the second layer B2 is set to be equal to or greater than 10 nm.

Incidentally, as the "silver alloy", it is possible to employ an alloy made of silver added with any one or more of copper, palladium, gold, zinc, tin, magnesium, nickel, titanium by a ratio from 0.4 to 4.5 mass % approximately. As a specific example, it is possible to employ "APC-TR" (manufactured by Furuya Metal Co., Ltd.), which is a silver alloy prepared by adding copper and palladium to silver.

Incidentally, in the following description, explanation will be made on a premise of using silver to constitute the first layer B1.

As the "aluminum alloy", it is possible to employ an alloy made of aluminum added with any one or more of copper, manganese, silicon, magnesium, zinc, carbon steel for machine structure, yttrium, lanthanum, gadolinium, terbium.

Incidentally, in the following description, explanation will be made on a premise of using aluminum to constitute the second layer B2.

The anti-alloying layer B3 is constituted as a transparent nitride membrane or a transparent oxide membrane.

As examples of the transparent nitride membrane, $Si_3N_4$, AlN can be cited.

As examples of the transparent oxide membrane, $Al_2O_3$, $SiO_2$, $TiO_2$, $ZrO_2$, $HfO_2$, $Nb_2O_5$, $Ta_2O_5$, and other oxides which can be readily formed into membrane by such technique as vapor deposition or sputtering can be cited. The details of this will be described later.

The anti-alloying transparent layer B3 has a thickness providing, as a resonance wavelength, any wavelength of the wavelengths equal to or less than 400 nm, preferably equal to or less than 300 nm. The details of this will be described later.

Further, the radiative cooling device CP is configured such that the infrared radiative layer A is used as a "substrate", on which the first layer B1, the anti-alloying transparent layer B3 and the second layer B2 are stacked.

More particularly, between the infrared radiative layer A as the substrate and the first layer B1, a gapless contact layer 3 is stacked and also on the side of the second layer B2 opposite to the presence side of the anti-alloying transparent layer B3, an anti-oxidization layer 4 is stacked.

Specifically, the radiative cooling device CP is produced by forming and stacking the gapless contact layer 3, the first layer B1, the anti-alloying transparent layer B3, the second layer B2 and the anti-oxidization layer 4 one after another by e.g. a sputtering technique on the infrared radiative layer A as a substrate.

The gapless contact layer 3 is prepared by forming aluminum oxide ($Al_2O_3$) in the form of a membrane of 20 to 100 nm.

The anti-oxidization layer 4 is prepared by forming silicon dioxide ($SiO_2$) or aluminum dioxide ($Al_2O_3$) in the form of a membrane of 10 to several 100 nm's.

Incidentally, in the following description, explanation will be made on a premise of a membrane of silicon dioxide ($SiO_2$) being formed.

The infrared radiative layer A is constituted of glass (white plate glass) of any one of alkali free glass, crown glass and borosilicate glass.

Incidentally, as alkali free glass, it is possible to employ e.g. OA10G (manufactured by Nippon Electric Glass Co., Ltd.). As crown glass, it is possible to employ e.g. B270 (registered trademark, same as below). As borosilicate glass, it is possible to employ e.g. TEMPAX (registered trademark, same as below).

Figure 8:
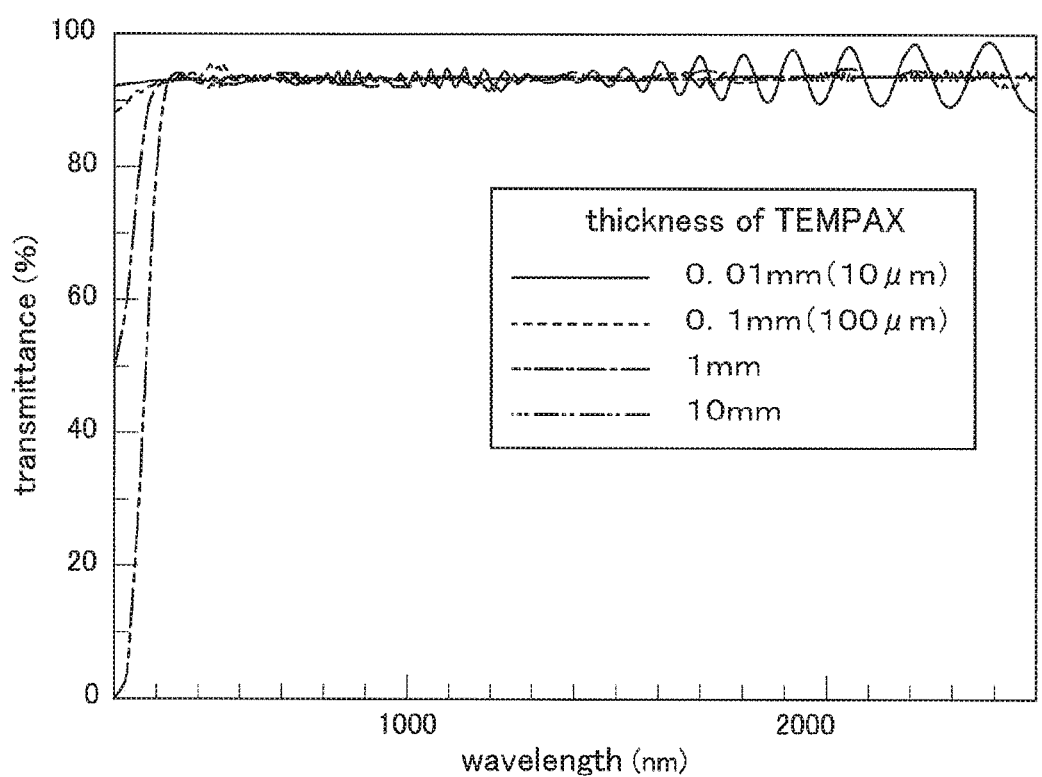
FIG. 8 is a graph showing transmittance of respective kinds of glass constituting an infrared radiative layer.
Figure 9:
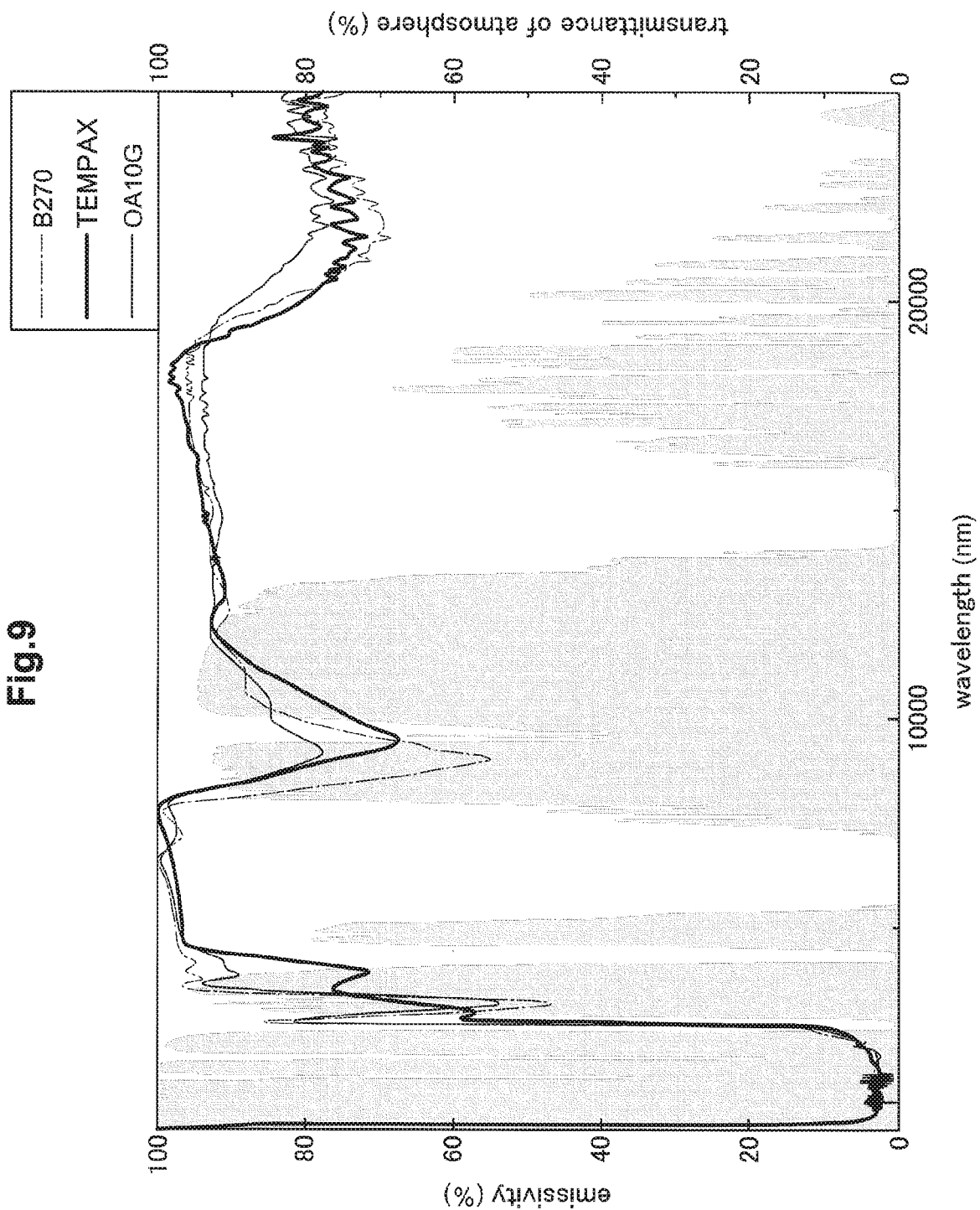
FIG. 9 is a graph showing emissivity of respective kinds of glass constituting the infrared radiative layer, FIG. 10 a view showing a first reference arrangement of the radiative cooling device.

The "OA10G", "B270" and "TEMPAX", as shown in FIG. 8, all have high transmittance for light having wavelengths corresponding to the solar light and have also high emissivity for the wavelength corresponding to the wavelength range of high transmittance for the atmosphere (so called "atmospheric window") as shown in FIG. 9.

Incidentally, FIG. 8 shows "TEMPAX" as an example, however, same is true with "OA10G", "B270", etc.

Incidentally, in the following description, explanation will be made on a premise of the infrared radiative layer A being formed of "TEMPAX".

Therefore, the radiative cooling device CP is configured to reflect a part(s) (e.g. a part(s) of the solar light) of light L incident on this radiative cooling device CP by the radiative surface H of the infrared radiative layer A and to reflect the light (e.g. ultraviolet light) transmitted through the infrared radiative layer A of the light L incident on the radiative cooling device CP by the light reflective layer B.

And, the heat input to the radiative cooling device CP from a cooling target D positioned on the side of the anti-oxidization layer 4 opposite to the presence side of the light reflective layer B (e.g. heat input due to heat conduction from the cooling target D) is converted into infrared light (radiation) IR by the infrared radiative layer A to be radiated as such, thereby to cool the cooling target D.

Incidentally, in the instant embodiment, the term "light" means electromagnetic waves having wavelengths ranging from 10 nm to 20000 nm. Namely, the light L is inclusive of ultraviolet light, infrared light (radiation) IR and the visible light.

Cooling Capacity of Radiative Cooling Device

Figure 2:
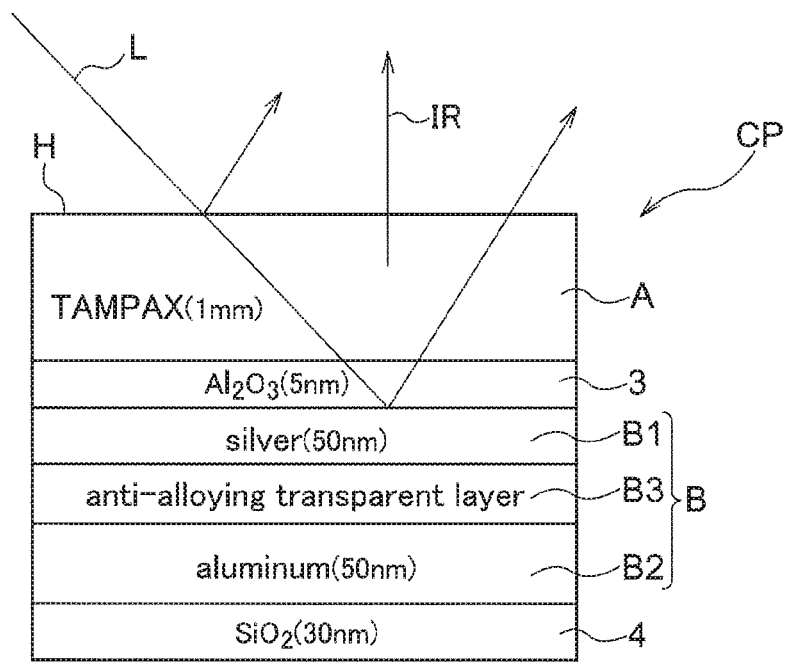
FIG. 2 is a view showing an arrangement of the radiative cooling device according to an embodiment.

As shown in FIG. 2, the radiative cooling device CP was constructed by forming the infrared radiative layer A with using TEMPAX having thickness of 1 mm, the light reflective layer B with using a first layer B1 of silver having a membrane thickness of 50 nm and a second layer B2 of aluminum having a membrane thickness of 50 nm and forming the gapless contact layer 3 with using aluminum oxide ($Al_2O_3$) having a membrane thickness of 5 nm, and forming the anti-oxidization layer 4 with using silicon dioxide ($SiO_2$) having a membrane thickness of 30 nm, and further forming the anti-alloying transparent layer B3 of the light reflective layer B of $Si_3N_4$ as a transparent nitride membrane or $Al_2O_3$ as a transparent oxide membrane. In this case, the cooling capacity of the radiative cooling device CP was measured with varying the thickness of $Si_3N_4$ as a transparent nitride membrane or the thickness of $Al_2O_3$ as a transparent oxide membrane. FIG. 3 and FIG. 4 show the results obtained.

For the tables in FIG. 3 and FIG. 4, calculations were made with using a fine day in Osaka in late August as a model.

More particularly, the calculations were made based on the model in late August, with conditions of the solar light energy of 1000 W/m$^2$, the outside temperature of 30° C., the atmosphere emissivity energy of 387 W/m$^2$ and the temperature of the radiative cooling device CP (the temperature of the surface of the anti-oxidization layer 4 on the opposite side to the presence side of the light reflective layer B, this temperature may be referred to as a "cooling surface temperature" hereinafter) of 30° C.

As shown in FIG. 3, the thickness (membrane thickness) of $Si_3N_4$ is best when it is equal to or less than 34 nm, or it may be equal to or less than 47 nm. The reason for this will be described later.

As shown in FIG. 4, the thickness (membrane thickness) of $Al_2O_3$ is best when it is equal to or less than 44 nm, or it may be equal to or less than 60 nm. The reason for this will be described later.

Study on Radiative Cooling Device

In a case of constituting the light reflective layer B of the first layer B1 alone (see FIG. 5) and a case of constituting the light reflective layer B of the first layer B1 and the second layer B2 (see FIG. 6), cooling capacities of the radiative cooling device CP were measured with varying the thickness of silver of the first layer B1, whereby results shown in FIG. 7 were obtained.

For the table in FIG. 7, calculations were made with using a fine day in Osaka in late August as a model.

More particularly, the calculations were made based on the model in late August, with conditions of the solar light energy of 1000 $W/m^2$, the outside temperature of 30° C., the atmosphere emissivity energy of 387 $W/m^2$ and the temperature of the radiative cooling device CP (cooling surface temperature) of 30° C.

Incidentally, the cooling capacities shown in FIG. 7 were calculated on a premise of the anti-alloying transparent layer B3 being not present.

As shown in FIG. 7, in the case of constituting the light reflective layer B of the first layer B1 alone (see FIG. 5), when the thickness of silver forming the first layer B1 became equal to or less than 30 nm, the radiative cooling device CP failed to provide cooling capacity. Whereas, in the case of constituting the light reflective layer B of the first layer B1 and the second layer B2 (see FIG. 6), when the thickness of silver was greater than 3.3 nm, the radiative cooling device CP provided the cooling capacity.

Moreover, in the case of constituting the light reflective layer B of the first layer B1 and the second layer B2 (see FIG. 6), when the thickness of silver was from 50 nm to 100 nm, the cooling capacities of the radiative cooling device CP were equivalent to that of a case of setting the silver thickness to 300 nm in the case of constituting the light reflective layer B of the first layer B1 alone (see FIG. 5).

Incidentally, the thickness of TEMPAX constituting the infrared radiative layer A needs to be equal to or greater than 10 μm and equal to or less than 10 cm. Preferably, the thickness is equal to or greater than 20 μm and equal to or less than 10 cm, more preferably, equal to or greater than 100 μm and equal to or less than 1 cm.

Namely, by configuring the infrared radiative layer A to exhibit high heat emissivity in the infrared range having wavelength equal to or greater than 8 μm and equal to or less than 14 μm, which heat emissivity is greater than those of AM1.5G solar light and the atmosphere which are absorbed by the infrared radiative layer A and the light reflective layer B respectively, it is possible to configure a radiative cooling device CP capable of achieving radiative cooling function providing temperature reduction relative to the surrounding atmosphere day and night.

And, to the above-described end, in case the infrared radiative layer A is formed of TEMPAX, its thickness needs to be equal to or greater than 10 μm and equal to or less than 10 cm, preferably equal to or greater than 20 μm and equal to or less than 10 cm, even more preferably equal to or greater than 100 μm and equal to or less than 1 cm.

In this way, when the light reflective layer B is constituted of the first layer B1 and the second layer B2, the cooling capacity of the radiative cooling device CP is improved. However, after lapse of a long period of time with continuation of the condition of silver and aluminum being kept in contact with each other, alloying between silver and aluminum will develop progressively, thus resulting in reduction in the reflectance for solar light, and eventually in increase in the absorption of solar light. Thus, by disposing the anti-alloying transparent layer B3 between the first layer B1 and the second layer B2, alloying between silver and aluminum will be suppressed.

And, with the provision of the anti-alloying transparent layer B3 between the first layer B1 and the second layer B2, there occurs slight reduction in the reflectance for the solar light in the light reflective layer B, thus leading to slight increase in the absorption of solar light. However, as shown in FIG. 3 and FIG. 4, in comparison with a case in which the thickness of $Si_3N_4$ as a transparent nitride membrane or $Al_2O_3$ as a transparent oxide membrane is set to 0 nm, namely, the case of absence of the anti-alloying transparent layer B3, although there occurs slight reduction in the cooling capacity of the radiative cooling device CP, as the alloying between silver and aluminum is suppressed, it becomes possible to maintain the reflective performance of the light reflective layer B for an extended period of time.

Supplementary Explanation of First Layer and Second Layer

Next, supplementary explanation will be provided on the arrangement of providing the light reflective layer B of the radiant cooling device CP with the first layer B1 and the second layer B2.

Figure 10:
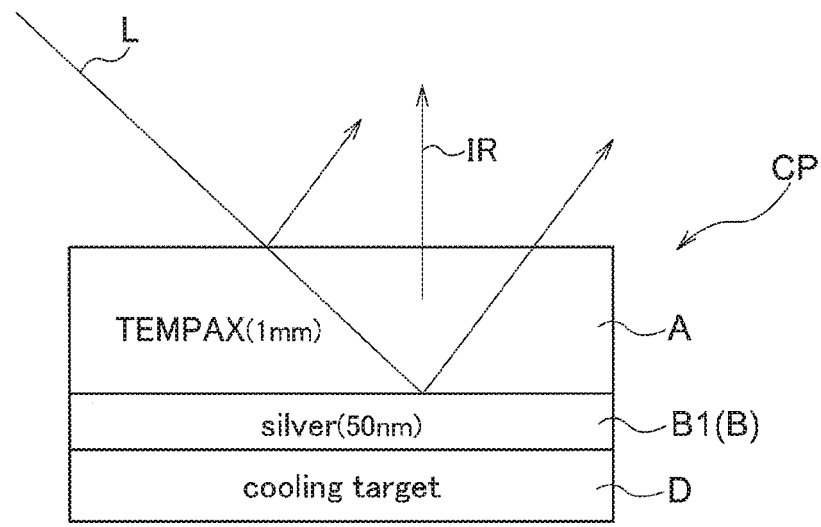
Figure 11:
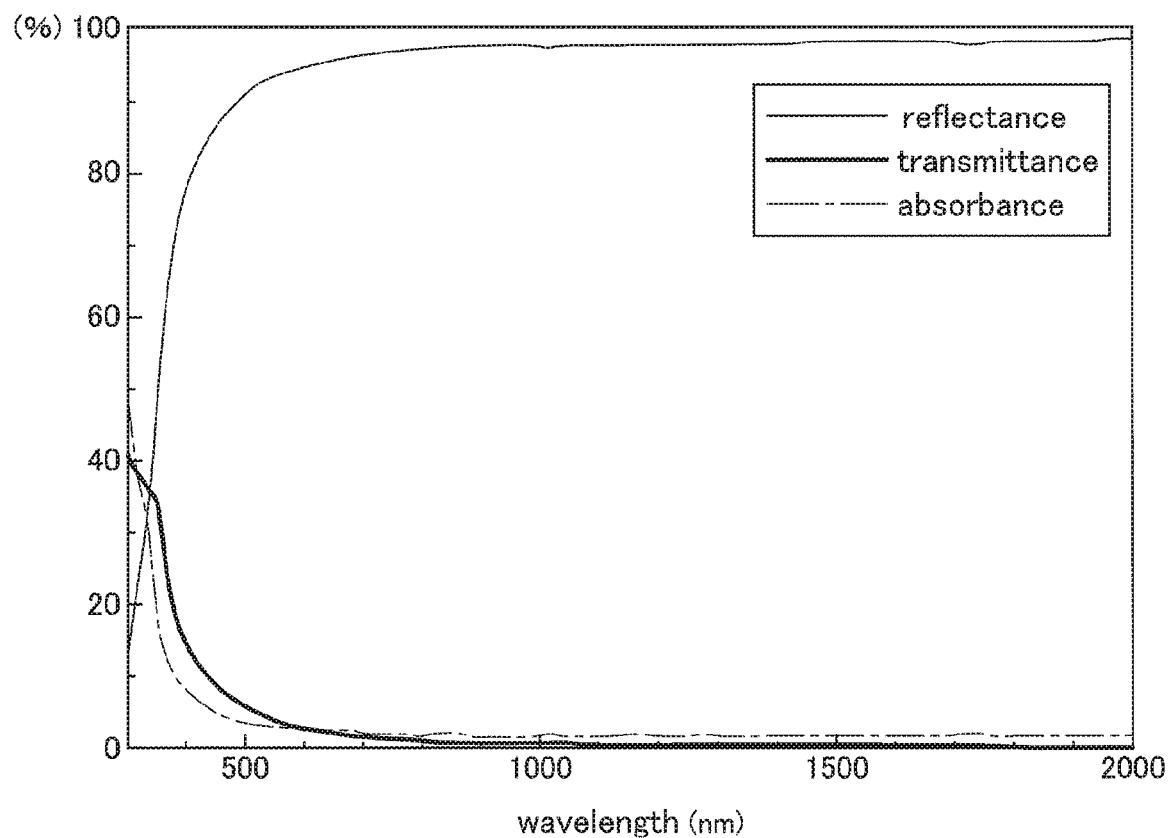
FIG. 11 is a graph showing a reflectance, a transmittance, and an absorbance relating to the first reference arrangement.

As shown in FIG. 10, in the case of constituting the light reflective layer B of the radiative cooling device CP of only the first layer B1 made of sliver having thickness of 50 nm, as shown in FIG. 11, the short-wavelength side light will be transmitted through the 50 nm silver constituting the first layer B1 and this transmitted light will be irradiated onto the cooling target D.

Figure 12:
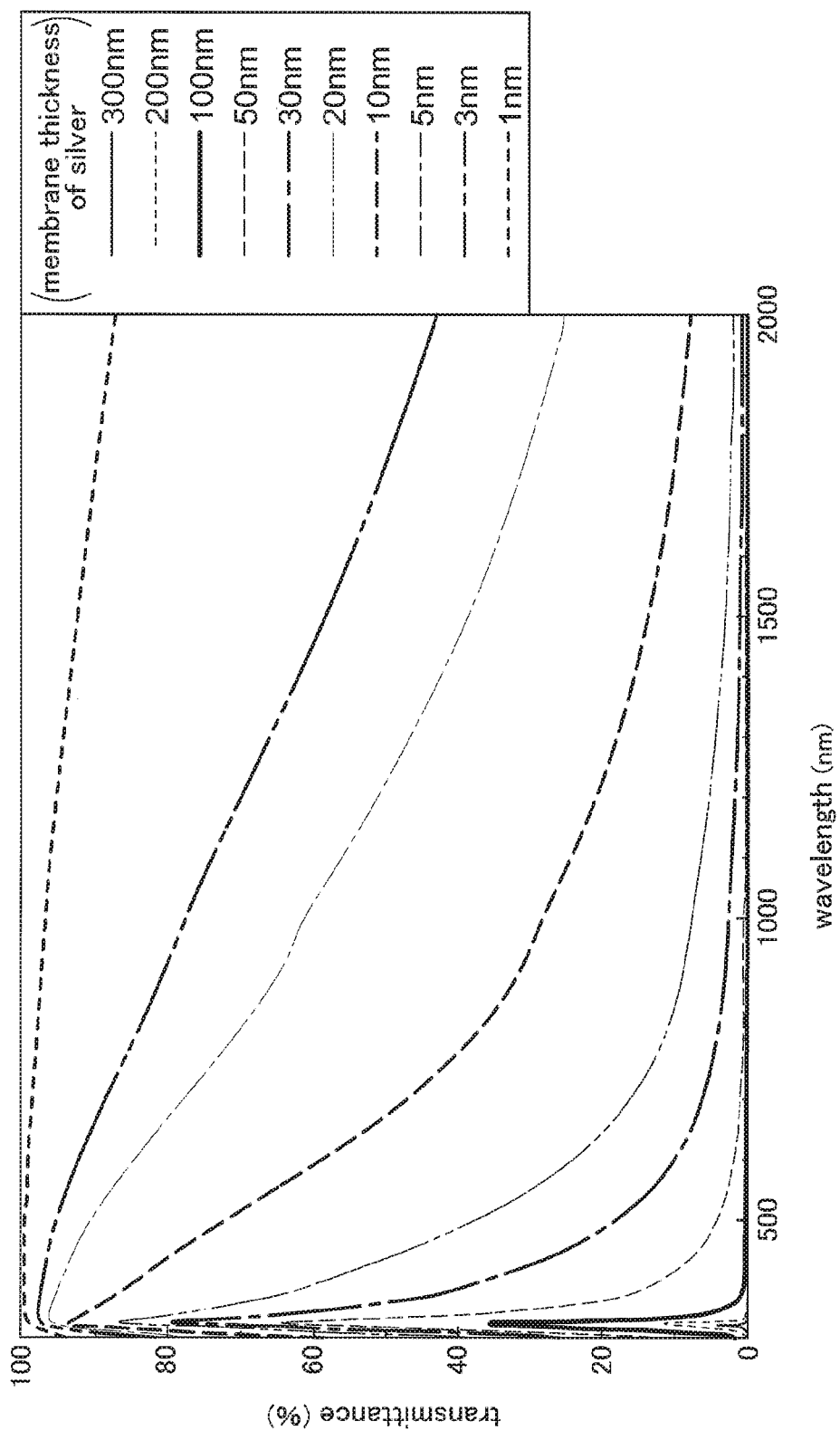
FIG. 12 is a graph showing relation between membrane thickness and transmittance of silver.

As shown in FIG. 12, with reduction in the membrane thickness (thickness) of silver, the thinner the membrane, the higher its transmittance. Thus, in the case of constituting the light reflective layer B of the first layer B1 alone, there occurs a phenomenon that the amount of light irradiated onto the cooling target D increases with reduction in the silver membrane thickness (thickness), the temperature of the cooling target D rises in spite of cooling thereof by the radiative cooling device CP.

Namely, the cooling target D will be constituted as a light absorbing layer or a heat exchanger for the purpose of efficient dissipation of heat of a cooled object. However, if the membrane thickness (thickness) of silver constituting the first layer B1 is reduced, the light transmitted therethrough will heat the cooling target D, so the radiative cooling capacity (radiative cooling performance) will be lessened.

Figure 13:
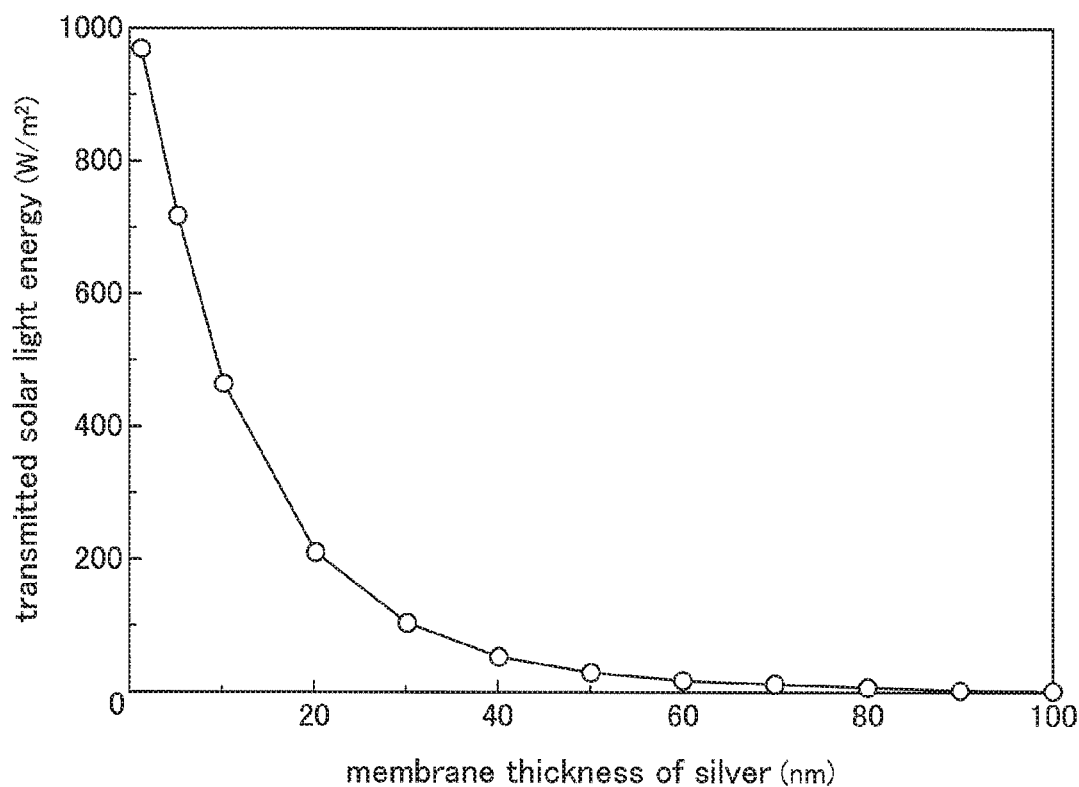
FIG. 13 is a graph showing transmitted solar light energy when the membrane thickness of silver is varied.

FIG. 13 shows the relation between the silver membrane thickness (thickness) and the transmitted solar light energy ($W/m^2$) in the radiative cooling device CP (see FIG. 10) in which the light reflective layer B is constituted of the first layer B1 made of silver.

The radiative cooling capacity of the conventional radiative cooling device CP in which the membrane thickness (thickness) of silver constituting the first layer B1 is set to 300 nm is approximately 70 $W/m^2$, at time of meridian crossing in summer in Japan, at 0 m altitude, 30° C. of outside temperature, though it may vary depending on the humidity and clearness of air.

On the other hand, when the membrane thickness (thickness) of silver constituting the first layer B1 is 100 nm, the energy of transmitted solar light becomes 7 $W/m^2$ approximately, and as this transmitted light heats the cooling target D, the radiative cooling capacity of the radiative cooling device CP will be reduced by about 10%.

Further, when the membrane thickness (thickness) of silver constituting the first layer B1 is 50 nm, the energy of transmitted solar light becomes 70 W/m² approximately, and as this transmitted light heats the cooling target D, the radiative cooling capacity of the radiative cooling device CP will be reduced significantly.

As described above, based on FIGS. 10 through 13 illustrations, explanation has been made on the problem that occurs when the membrane thickness (thickness) of the silver is reduced in the case of constituting the light reflective layer B of the first layer B1 alone.

Namely, in the case of constituting the light reflective layer B of the first layer B1 alone, it is not possible to sufficiently reduce the membrane thickness (thickness) of the silver which constitutes the first layer B1.

Figure 14:
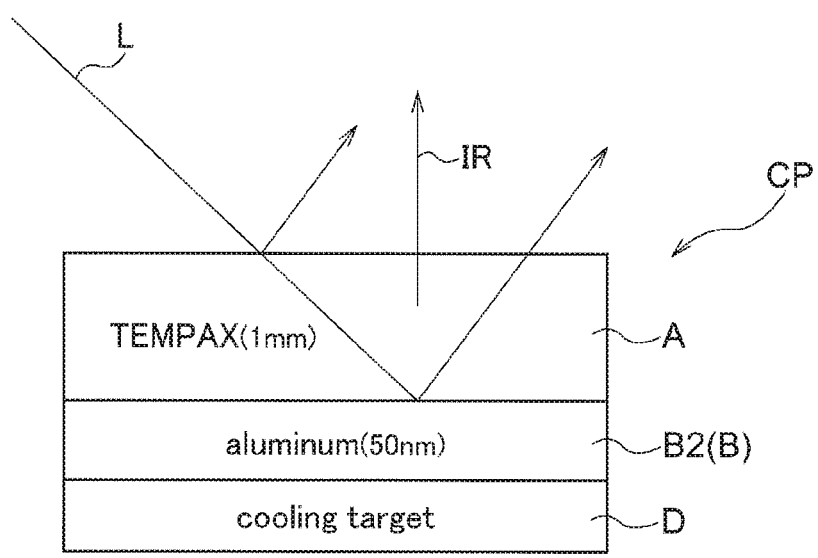
FIG. 14 is a view showing a second reference arrangement of the radiative cooling device.

Next, study will be made whether it is possible or not to substitute aluminum as a further metal for silver. Namely, since aluminum is known as a metal having a high reflectance like silver, it is conceivable to constitute the light reflective layer B of the second layer B2 alone, as shown in FIG. 14.

Figure 16:
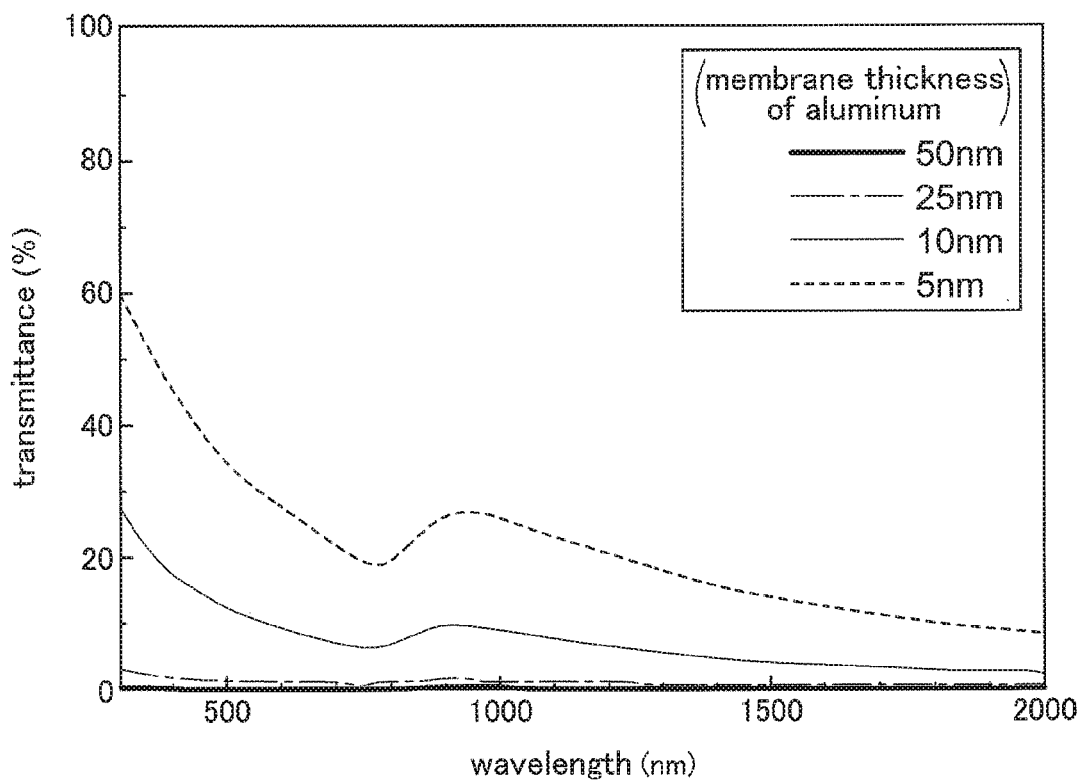
FIG. 16 is a graph showing relation between membrane thickness and transmittance of aluminum.

As shown in FIG. 16, aluminum, if having a membrane thickness (thickness) equal to or greater than 25 nm, can appropriate block solar light transmission.

Figure 15:
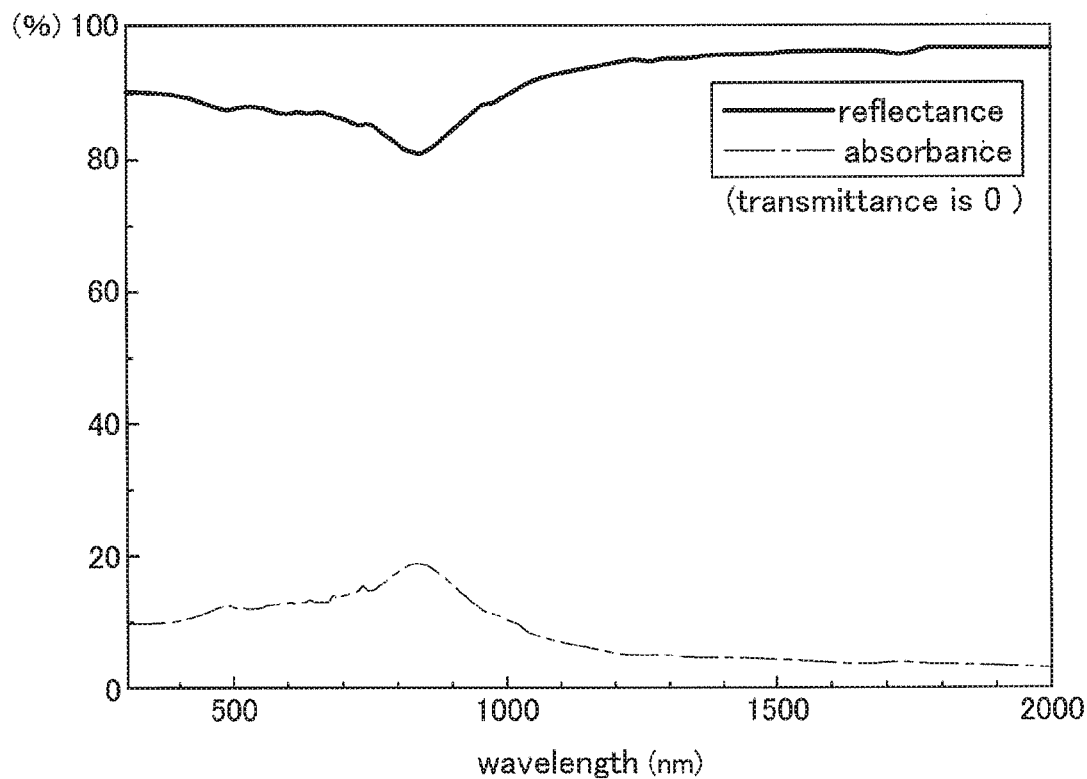
FIG. 15 is a graph showing a reflectance, a transmittance, and an absorbance relating to the second reference arrangement.
Figure 17:
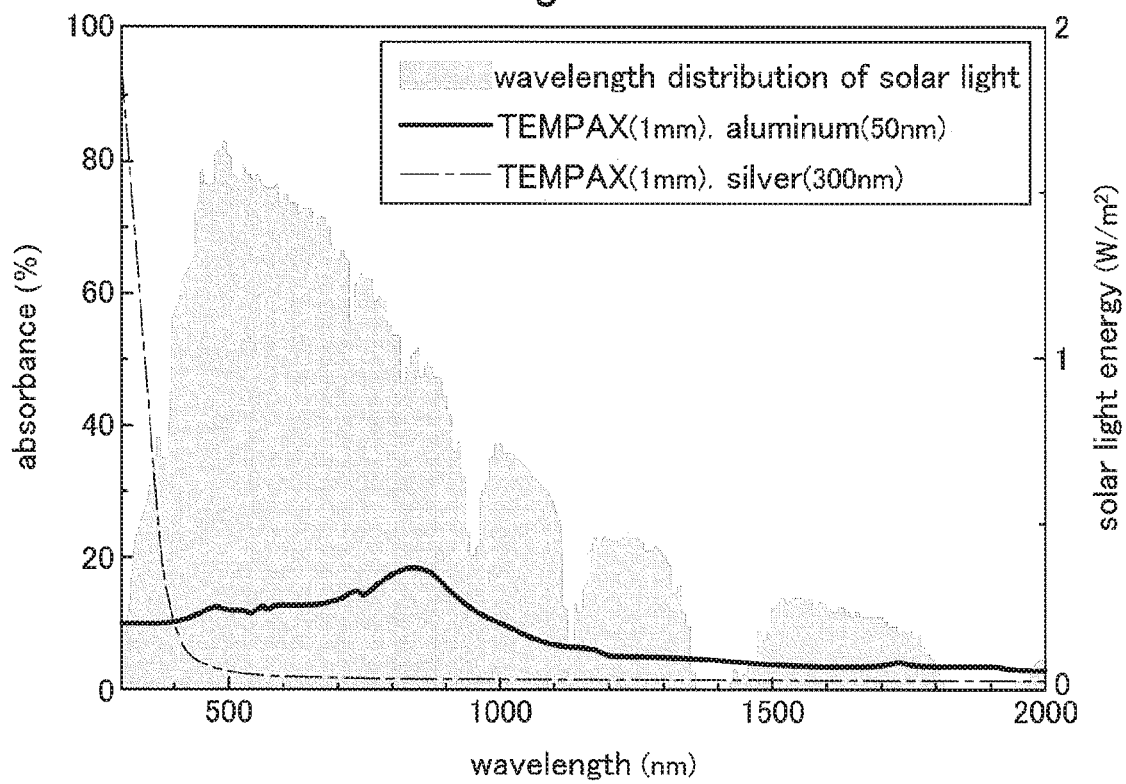
FIG. 17 is a graph showing absorbances of the first reference arrangement and the second reference arrangement.

However, as shown in FIG. 15, aluminum has a tendency of having high absorbance for solar light. Moreover, as shown in FIG. 17, aluminum (membrane thickness of 50 nm) absorbs more solar light than silver (membrane thickness of 300 nm).

Figure 18:
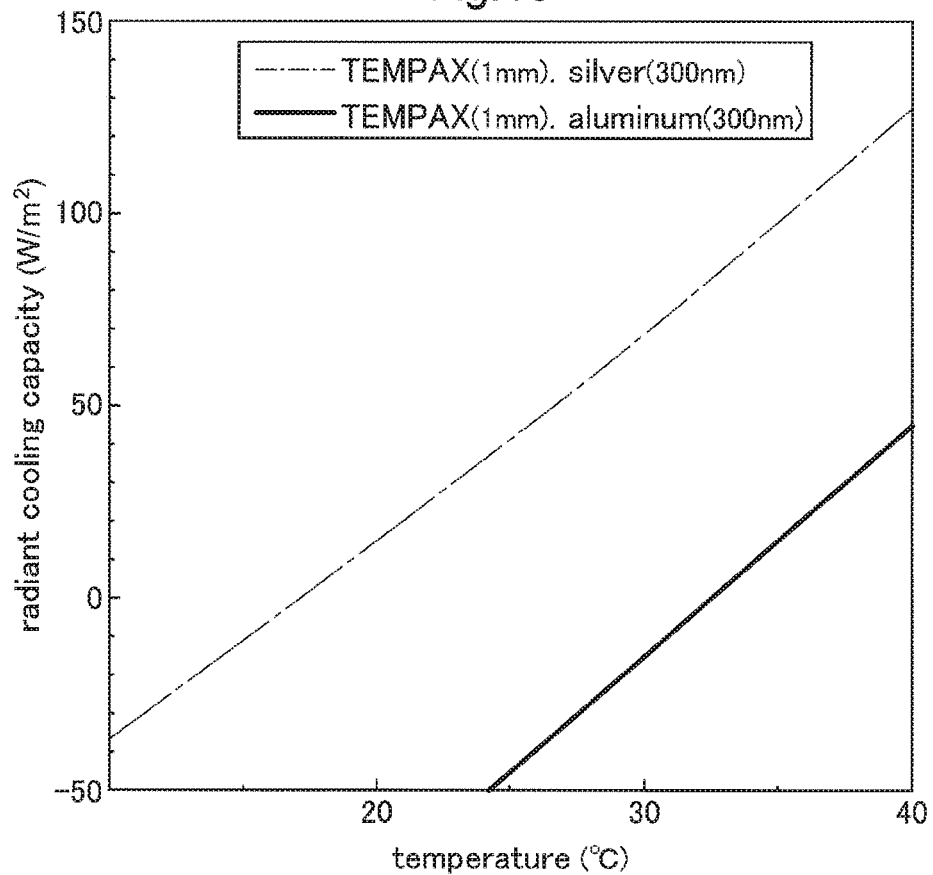
FIG. 18 is a graph showing cooling capacities of the first reference arrangement and the second reference arrangement.

As a result, as shown in FIG. 18, in case the light reflective layer B is constituted of the second layer B2 alone and the membrane thickness (thickness) of aluminum constituting the second layer B2 is set to 300 nm, the radiative cooling capacity at the time of meridian passage at 30° C. outside temperature becomes—14.7 W/m², thus causing heat generation. Incidentally, in the above, occurrence of cooling is represented by the positive sign and occurrence of heat generation is represented by the negative sign.

Incidentally, as shown in FIG. 18, in the case of constituting the light reflective layer B of the first layer B1 alone and the membrane thickness (thickness) of silver constituting the first layer B1 is set to 300 nm, the radiative cooling capacity at the time of meridian passage at 30° C. outside temperature becomes 70 W/m², approximately.

As described above, based on the FIGS. 14 through 18 illustrations, explanation has been made on the problem that occurs when the light reflective layer B is constituted of the second layer B2 alone.

Namely, it may be understood that it is not possible to make the radiative cooling capacity of the radiative cooling device CP sufficient in the case of constituting the light reflective layer B of the second layer B2 alone.

Then, as the result of the extensive and intensive research efforts made by the present inventors, it has been found that if the light reflective layer B of the radiative cooling device CP is constituted of the first layer B1 and the second layer B2, it is possible to make the radiative cooling capacity sufficient while reducing the membrane thickness (thickness) of silver constituting the first layer B1.

More particularly, as shown in FIG. 12, the transmittance of silver constituting the first layer B1 becomes greater on the shorter wavelength side and becomes also greater with reduction in the membrane thickness (thickness).

Figure 21:
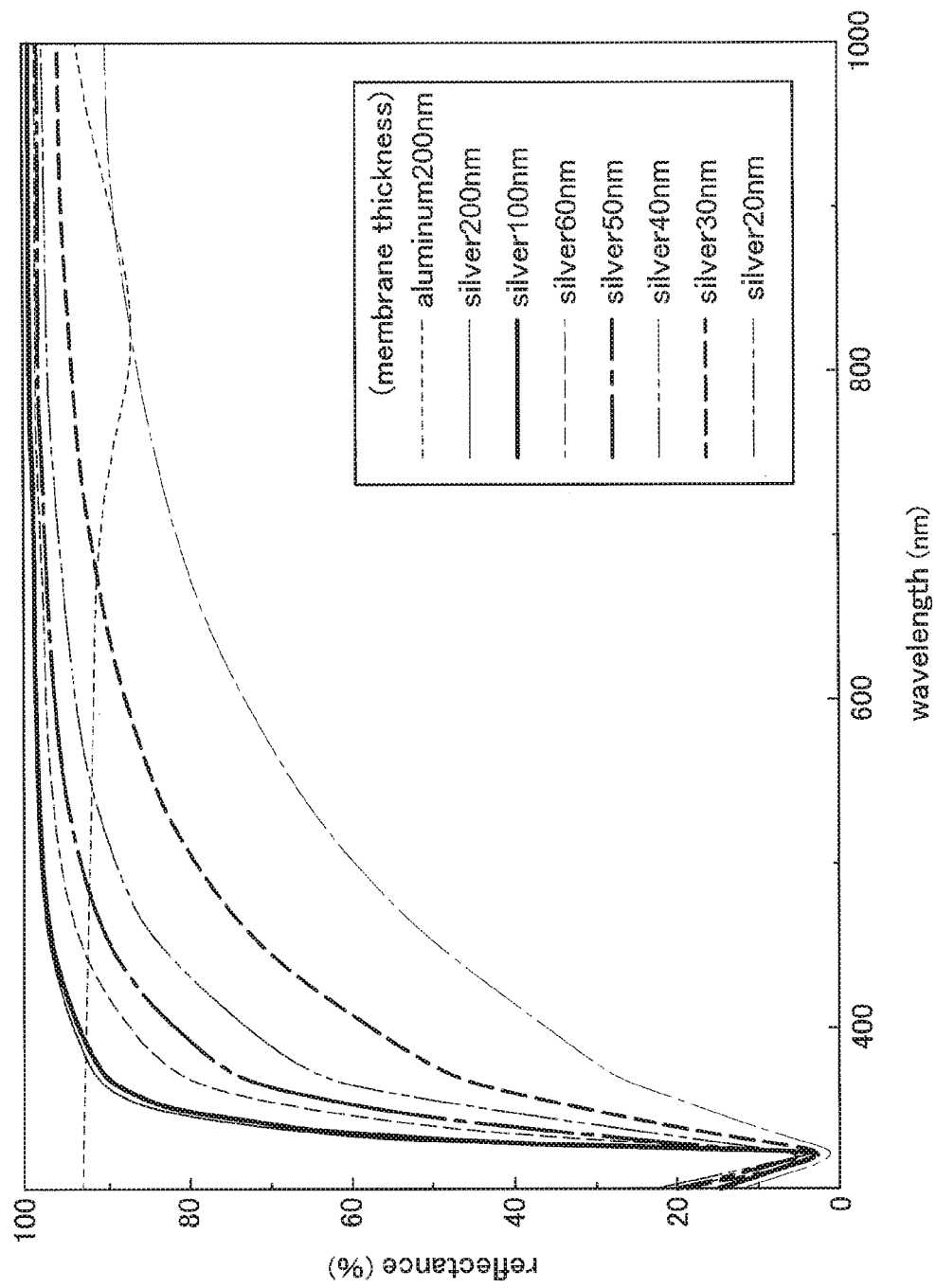
FIG. 21 is a graph showing relation between the membrane thickness and reflectance of silver.

Further, as shown in FIG. 21, the reflectance silver constituting the first layer B1 becomes greater on the longer wavelength side and becomes smaller on the shorter wavelength side, and also this becomes smaller with reduction in the membrane thickness (thickness).

Moreover, aluminum of the second layer B2, as described above, has a high reflectance capable of appropriately blocking solar light transmission if it has a membrane thickness (thickness) equal to or greater than 25 nm and it also has the tendency of a high reflectance on the shorter wavelength side where the reflectance of silver becomes smaller and a low reflectance on the longer wavelength side where the reflectance of silver becomes higher.

Incidentally, as shown in FIG. 22, the wavelength where the reflectance of silver and the reflectance of aluminum cross each other (this will be referred to in short as "crossing wavelength" hereinafter) varies with the membrane thickness (thickness) of silver.

FIG. 22 illustrates such crossing wavelengths with variation of the silver membrane thickness (thickness) in case the membrane thickness (thickness) of aluminum is fixed to 200 nm.

Figure 19:
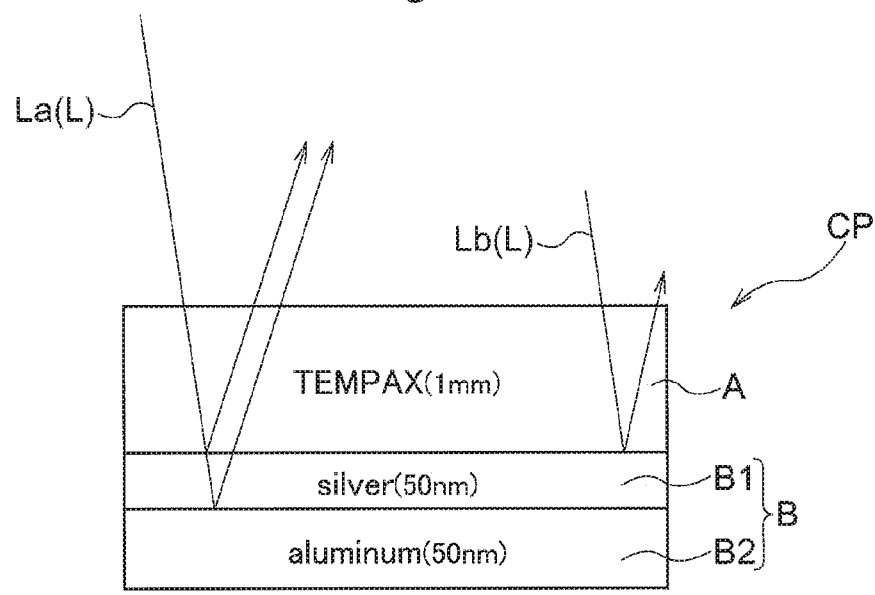
FIG. 19 is a view showing a principle arrangement of the radiative cooling device.
Figure 20:
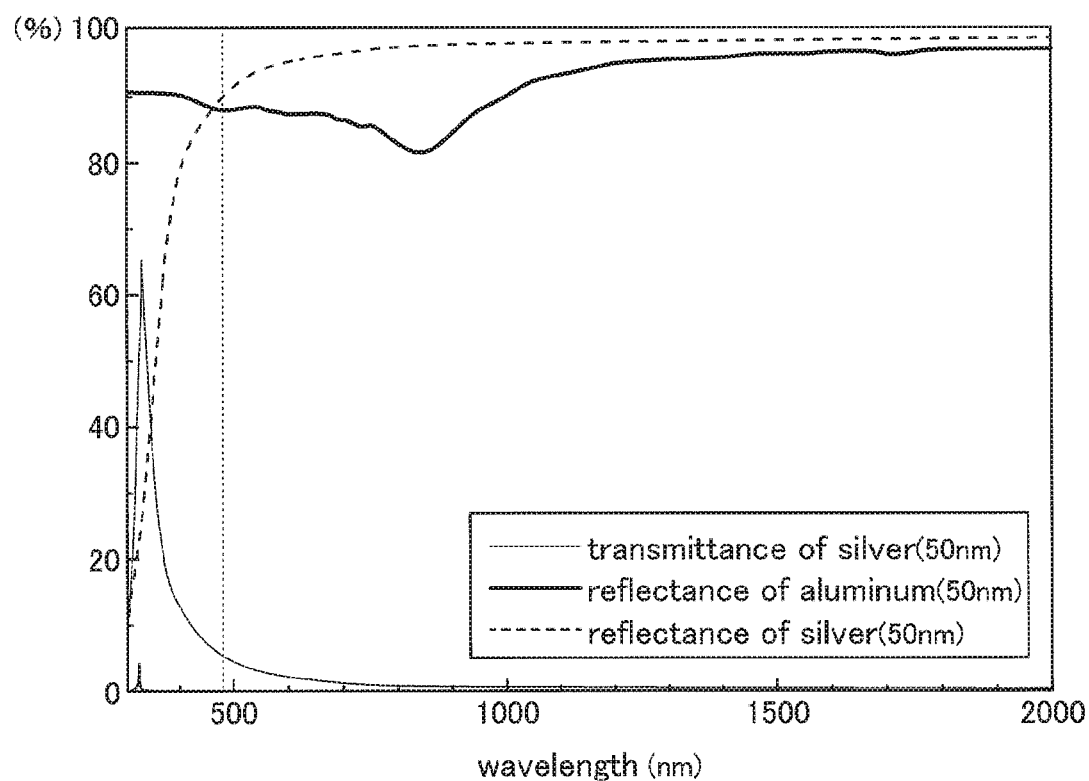
FIG. 20 is a view comparing transmittance and reflectance of silver and aluminum in the principle arrangement.

For this reason, as shown in FIG. 19, in the case of constituting the light reflective layer B of the first layer B1 and the second layer B2, if e.g. the membrane thickness (thickness) of silver constituting the first layer B1 is set to 50 nm and the membrane thickness (thickness) of aluminum constituting the second layer B2 is set to 50 nm. Then, as shown in FIG. 20, the crossing wavelength becomes 450 nm, for light La on the shorter wavelength side than 450 nm, aluminum has a higher reflectance than silver and for light Lb on the longer wavelength side than 450 nm, silver has a higher reflectance than aluminum.

Incidentally, as shown in FIG. 12, light having a wavelength shorter than 450 nm as the crossing wavelength can be easily transmitted through silver, and this transmitted light will be irradiated onto the aluminum of the second layer B2.

Namely, as shown in FIG. 19, the light La on the shorter wavelength side than 450 nm will be reflected by the first layer B1 formed partially of silver and the light transmitted through the first layer B1 will be reflected by the second layer B2 formed of aluminum.

Further, the light Lb on the longer wavelength side than 450 nm will be reflected mainly by the first layer B1.

Also, in the case of constituting the light reflective layer B of the first layer B1 and the second layer B2, if the membrane thickness (thickness) of aluminum constituting the second layer B2 is greater than 10 nm, almost no transmission of light will occur. So, the membrane thickness (thickness) of the second layer B2 is to be set to equal to or greater than 10 nm.

Incidentally, when improvement of corrosion resistance is contemplated, it is preferred that the membrane thickness (thickness) of aluminum constituting the second layer B2 be equal to or greater than 50 nm. This is because aluminum is oxidized to form a passive state, but durability improves with increase in thickness of its layer capable of forming such passive state.

Therefore, in the case of constituting the light reflective layer B of the first layer B1 and the second layer B2, if the membrane thickness (thickness) of silver of the first layer B1 is set to 50 nm and the membrane thickness (thickness) of aluminum of the second layer B2 is set to 50 nm, light in the wavelength range on the longer wavelength side than 450 nm for which aluminum provides high light absorbance will be reflected mainly by silver of the first layer B1 and light having wavelength equal to or smaller than 450 nm transmitted through silver will be reflected mainly by aluminum of the second layer B2, whereby light or radiation transmitted through the infrared radiative layer A can be reflected in an efficient manner.

As described above, in the case of constituting the light reflective layer B of the first layer B1 and the second layer B2, by reflecting light on the longer wavelength side than the crossing wavelength mainly by the silver of the first layer B1 and reflecting light on the shorter side than the crossing wavelength transmitted through the silver mainly by the aluminum of the second layer B2, it is possible to reflect the light or the like transmitted through the infrared radiative layer A in an efficient manner.

Consequently, with the radiative cooling device CP in which the light reflective layer B is constituted of the first layer B1 and the second layer B2, the reflectance of solar light can be improved sufficiently by setting the membrane thickness (thickness) of the first layer B1 to equal to or less than 100 nm and equal to or greater than 50 nm.

Studying again the cooling capacity shown in FIG. 7 (radiative cooling performance), in consideration to the supplementary explanation based on FIGS. 10 through 22 illustrations, in the case of constituting the light reflective layer B of the first layer B1 alone, when the membrane thickness of silver becomes equal to or less than 100 nm, the solar light will be transmitted through the radiative cooling device CP to heat the cooling target D, so the radiative cooling capacity (radiative cooling performance) will deteriorate.

For this reason, in the case of constituting the light reflective layer B of the first layer B1 alone, in comparison with the case of completely blocking the transmission of solar light by setting the membrane thickness (thickness) of silver to 300 nm, there will occur about 10% reduction in the radiative cooling capacity (radiative cooling performance) if the membrane thickness (thickness) of the silver is set to 80 nm.

And, if the membrane thickness (thickness) of the silver is set to less than 40 nm, there will occur significant reduction in the radiative cooling capacity (radiative cooling performance) and if it is set to equal to or less than 30 nm, the cooling target D will be heated.

In contrast, in the case of constituting the light reflective layer B of the first layer B1 and the second layer B2, as described above, if the thickness of the silver of the first layer B1 is greater than 3.3 nm, the radiative cooling device CP will provide the radiative cooling capacity (radiative cooling performance).

Moreover, when the thickness of the silver forming the first layer B1 ranges from 50 nm to 100 nm, the radiative cooling capacity (radiative cooling performance) of the radiative cooling device CP becomes equivalent to the capacity of the case of setting the silver thickness to 300 nm in the case of constituting the light reflective layer B of the first layer B1 alone (see FIG. 2).

[Supplementary Explanation on Anti-Alloying Transparent Layer]

As describe above, when a long period of time has elapsed with continuation of the condition of silver of the first layer B1 and aluminum of the second layer B2 being kept in contact with each other, alloying will progressively develop between silver and aluminum. As a result, it is anticipated that the reflectance of the light reflective layer B for the solar light will deteriorate and solar light absorption thereby will increase. Thus, the anti-alloying transparent layer B3 is to be provided between the first layer B1 and the second layer B2 in order to prevent alloying between silver and aluminum.

As such anti-alloying transparent layer B3 for preventing alloying between silver and aluminum, a transparent nitride membrane or a transparent oxide membrane that efficiently transmits the light transmitted through the silver of the first layer B1 is conceivable.

More particularly, the light reflective layer B of the inventive radiative cooling device is provided for causing the light in the range from the ultraviolet light to the visible light transmitted through the silver of the first layer B1 to be reflected by the aluminum of the second layer B2, thereby to reduce the use amount of silver which is a precious metal.

Thus, it is necessary for the transparent nitride membrane or the transparent oxide membrane constituting the anti-alloying transparent layer B3 to transmit the light transmitted through the silver of the first layer B1 as much as possible.

Therefore, the transparent nitride membrane or the transparent oxide membrane constituting the anti-alloying transparent layer B3 needs to be transparent to the range of light from the ultraviolet light to the visible light. In this regard, next, a study will be made to find what kind of transparent nitride membrane or transparent oxide membrane is suitable for such purpose as above.

Firstly, focusing will be made from the respect of chemical reactivity. For this focusing in the respect of chemical reactivity, it is preferred that screening be made with reference to the standard Gibbs energy of formation.

A reaction represented by Formula (1) below in which a metal A and oxygen reacts to each other proceeds in the direction of the standard Gibbs energy of formation being smaller.

$$nA + mO_2 \rightarrow AnO_2m \quad (1)$$

For instance, it is assumed that the reaction of Formula (2) has smaller standard Gibbs energy of formation than the reaction of Formula (1).

$$nB + mO_2 \rightarrow BnO_2m \quad (2)$$

In this case, if n mol of A and B are mixed with m mol of O, all oxygen will be bonded with B under the equilibrium condition. Further, if 1 mol of $AnO_2m$ and n mol of B are mixed, eventual change will occur to A and $BnO_2m$.

Namely, in order to allow silver (Ag) of the first layer B1 and aluminum (Al) of the second layer B2 to stay as metals semi-permanently thereby to allow the transparent nitride membrane or the transparent oxide membrane interposed between the first layer B1 and the second layer B2 to have high transparency semi-permanently, it is essential to select, as the material of the transparent nitride membrane or the transparent oxide membrane, such a material that forms a transparent nitride membrane or a transparent oxide membrane that will provide a smaller standard Gibbs energy of formation than silver or aluminum.

Specifically, following candidates can be cited. Incidentally, as for the material to form the transparent oxide membrane, since aluminum has low oxygen diffusibility, it will not be problematic if a material having higher standard formation energy than aluminum is selected.

(Specific Examples of Transparent Nitride Membrane)

In the case of the transparent nitride membrane, a material whose standard formation Gibbs energy is equal to or smaller than silver and aluminum may be selected.

Namely, since $Ag_3N$ (+315 kJ/mol) and AlN (−287 kJ/mol), a material smaller than −287 kJ/mol of Al will be appropriate and such material is desired also to be a material transparent to the range from the ultraviolet light to the visible light.

As some materials satisfying the above-described conditions, specifically, $Si_3N_4$(−676 kJ/mol) and AlN (−287 kJ/mol) can be cited.

Specific Examples of Transparent Oxide Membrane

In the case of the transparent oxide membrane, a material whose standard formation Gibbs energy is equal to or smaller than silver may be selected.

Namely, since $Ag_2O$ (−11 kJ/mol), a material smaller than −11 kJ/mol will be appropriate.

Incidentally, as described above, in the case of the transparent oxide membrane, use of material greater than the standard formation Gibbs energy (−1582 kJ/mol) of aluminum oxide $Al_2O_3$ is not problematic. This is because $Al_2O_3$ is a material whose oxygen diffusibility is extremely low.

Referring to some specific examples, if $Al_2O_3$ is placed in gapless contact with an oxide X whose standard formation Gibbs energy is low, about 1 to 2 atomic layers of this oxide X will be drawn into the Al, thus being changed into X and $Al_2O_3$. On the other hand, due to the extremely low oxygen diffusibility of $Al_2O_3$, the oxygen in the oxide X cannot be diffused into Al.

As a result, in the case of the transparent oxide membrane, the sole requirement for material section is the material having standard formation Gibbs energy smaller than 11 kJ/mol. And, this material is desired also to be transparent to the range from the ultraviolet light to the visible light.

As specific examples of material that satisfies the above requirement, the following can be cited. Incidentally, in the following, materials are classified by groups. It should be noted however that not all oxides classified under respective such group are superior in their transparency and standard formation Gibbs energy, so only those oxides satisfying the above requirement will be cited.

The first group element oxides: $Li_2O$ (−561 kJ/mol), $Na_2O$ (−375 kJ/mol), $K_2O$ (−320 kJ/mol).

The second group element oxides: BeO (−580 kJ/mol), MgO (−569 kJ/mol), CaO (−604 kJ/mol), SrO (−592 kJ/mol), BaO (−520 kJ/mol).

The fourth group element oxides: $TiO_2$ (−884 kJ/mol), $ZrO_2$ (−1042 kJ/mol), $HfO_2$ (−1088 kJ/mol).

The fifth group element oxides: $Nb_2O_5$ (−1766 kJ/mol), $Ta_2O_5$ (−1911 kJ/mol).

The thirteenth group element oxides: $B_2O_3$ (−1194 kJ/mol), $Al_2O_3$ (−1582 kJ/mol), $Ga_2O_3$ (−998 kJ/mol).

The fourteenth group element oxides: $SiO_2$ (−856 kJ/mol), $GeO_2$ (−500 kJ/mol), $SnO_2$ (−856 kJ/mol).

Incidentally, as materials to be prepared into membrane by the sputtering technique or the like, there are $Al_2O_3$(−1582 kJ/mol), $SiO_2$ (−856 kJ/mol), $TiO_2$ (−884 kJ/mol), $ZrO_2$ (−1042 kJ/mol), $HfO_2$ (−1088 kJ/mol), $Nb_2O_5$ (−1766 kJ/mol), $Ta_2O_5$ (−1911 kJ/mol). These materials can be formed into membrane easily.

Incidentally, as described above, $Al_2O_3$ has low oxygen diffusibility and its reaction speed is extremely low. However, oxygen contained in material whose standard formation Gibbs energy is greater than (smaller in the negative direction) than $Al_2O_3$(−1582 kJ/mol) will be taken away by Al over time, so its optical property tends to be changed from a long-term perspective such as several tens of years. Thus, for use in an application wherein there is concern about change over time due to long term use, $Al_2O_3$ as an oxide of Al or $Nb_2O_5$ (−1766 kJ/mol), $Ta_2O_5$ (−1911 kJ/mol) will be selected advantageously. Then, there occurs no change over time in the reflectance due to a reaction between Al and the transparent oxide membrane.

(Superiority Between Transparent Nitride Membrane and Transparent Oxide Membrane)

Study will be made to find which of a transparent nitride membrane or a transparent oxide membrane should be selected as the anti-alloying transparent layer B3. The conclusion is that a transparent nitride membrane should be employed from the respect of preparation.

Silver nitride ($Ag_3N$) and oxide ($Ag_2O$) are both black. The membrane of silver forming the first layer B1 is thin and transmits the light in the range from the ultraviolet light to the visible light. So, if a silver nitride or a silver oxide is produced, the light transmitted through the silver of the first layer B1 will be absorbed thereby, so that the radiant cooling performance under sunshine will deteriorate significantly. Namely, silver nitride membrane or oxide nitride membrane, even by a small amount, must not be produced.

Focusing on the standard formation Gibbs energy, study will be made to find which of a transparent nitride membrane or a transparent oxide membrane is more suitable as the anti-alloying transparent layer.

The standard formation Gibbs energy of $Ag_3N$ is +315 kJ/mol, and the standard formation Gibbs energy of $Ag_2O$ is −11 kJ/mol. Namely, $Ag_3N$ having a positive value of standard formation Gibbs energy is very unstable, and presence of Ag and $N_2$ in separation is more stable. In contrast, $Ag_2O$ having a negative value of standard formation Gibbs energy becomes more stable when present in the form of a silver oxide having black color than Ag and $O_2$ are present in separation.

Figure 25:
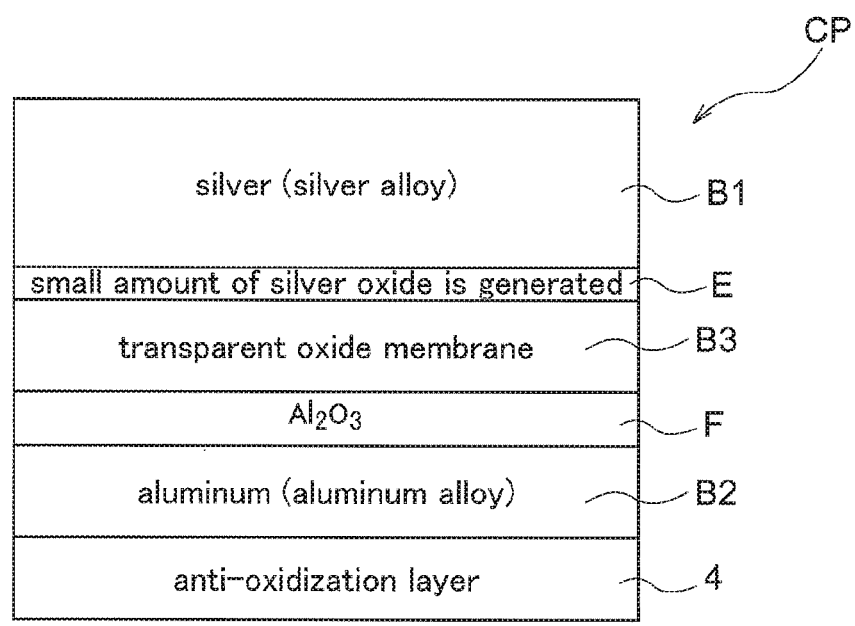
FIG. 25 is an explanatory view in case a transparent oxide membrane is formed.

Firstly, there will be considered a case of the anti-alloying transparent layer B3 being a transparent oxide membrane. As shown in FIG. 25, when a transparent oxide membrane is used as the anti-alloying transparent layer B3, at the time of preparation of this transparent oxide membrane, silver oxide E provided by oxidization of silver may be formed in the form of membrane between the first layer B1 and the anti-alloying transparent layer B3. Incidentally, between the anti-alloying transparent layer B3 and the second layer B2, whatever the material of the transparent oxide membrane may be, $Al_2O_3$ will be formed from the respect of the standard formation Gibbs energy.

For example, let us assume that the formation of any membrane is done by the sputtering technique. Incidentally, the sputtering is a technique in which radicalized gas in a plasma is applied as a physical energy to a target material and material struck out thereby will be laminated on a sample.

Further, when an oxide is formed into a membrane, it is generally practiced to form the membrane of gas in which oxygen radical was produced by introducing oxygen to the plasma.

And, oxides such as $Al_2O_3$ and $SiO_2$ generally have extremely low membrane forming rates. Thus, there is generally employed a method in which the target material prior to oxidization, which has a high sputtering rate such as Al, Si will be struck out and a large amount of oxygen is introduced into the plasma and the oxygen and the target material are reacted on the sample surface, thus producing an oxide. Incidentally, this method is referred to as "reactive sputtering".

When a sputtering membrane formation is implemented by such method as above, in the vicinity of the sample, a large amount of highly reactive oxygen radicals will be present, so oxygen and silver will react each other at an early stage of membrane formation and black silver oxide (see FIG. 23) will be formed.

The standard formation energy of silver is smaller to the negative side than the standard formation energies of most of transparent oxides. This means that oxygen is more stable when present in a transparent oxide than present in silver. However, in case there is no oxygen deficiency in the formed oxygen membrane, there is no place for oxygen to go, so silver oxide will not change into silver.

Moreover, when Al present via the transparent oxide member receives oxygen of the silver oxide to be changed into $Al_2O_3$, $Ag_2O$ will disappear, but since $Al_2O_3$ formed by oxidization of aluminum has an extremely low oxygen diffusibility as described above, so the reaction will stop soon, so there is not much room for sufficient movement of the oxygen in the silver oxide.

Therefore, silver oxide E once formed will not disappear. And, as the silver oxide E is a colored oxide as described above, this will absorb the light transmitted through silver of the first layer B1, thus leading to significant reduction in the radiant cooling performance under sunshine.

Incidentally, in the above, there was explained the case of forming membrane of oxide by the sputtering technique. However, in case a membrane is formed by e.g. the vapor deposition technique, no radicals are formed, so formation of silver oxide E can be suppressed. However, in the case of the vapor deposition too, oxygen in the heated oxide target can easily escape, and silver oxide E may be formed thereby. So, conditions need to be determined with much care. For the reasons mentioned above, it is believed that although it is possible to employ an oxide in the anti-alloying transparent layer B3, this will impose many restrictions on the method employed for membrane formation.

In view of the above, it is believed that as the anti-alloying transparent layer B3, a transparent nitride membrane is more suitable than a transparent oxide membrane. This is because discoloration of silver can still be prevented even if the membrane formation is done under "rough" conditions not limited to the sputtering technique or vapor deposition technique (even for the sake of improvement of productivity).

Incidentally, as described above, $Ag_3N$ (+315 kJ/mol) is very unstable, presence of Ag and $N_2$ in separation will be more stable. For this reason, with whatever conditions the membrane formation may be made, silver nitride (black color) will not be formed with such energy provided by the sputtering technique or vapor deposition technique.

Therefore, if a transparent nitride membrane is employed as the anti-alloying transparent layer B3, there can be obtained many variations of membrane forming, so use of a transparent nitride membrane is believed to be suitable as the anti-alloying transparent layer B3.

Thickness of Anti-Alloying Transparent Layer

As described above, it has been explained that although both a transparent nitride membrane and a transparent oxide membrane are usable as the anti-alloying transparent layer B3, a transparent nitride membrane is superior in the respect of production.

Next, thickness (membrane thickness) of the anti-alloying transparent layer B3 will be studied.

Preferably, the anti-alloying transparent layer B3 has a thickness (membrane thickness) providing, as a resonance wavelength, any wavelength of the wavelengths equal to or less than 400 nm. Still preferably, it is believed that the anti-alloying transparent layer B3 has a thickness (membrane thickness) providing, as a resonance wavelength, any wavelength of the wavelengths equal to or less than 300 nm.

More particularly, the (surface) plasmon resonance wavelength is determined precisely by refractive index distributions of silver of the first layer B1, the anti-alloying transparent layer B3 and aluminum of the second layer B2. This can be roughly estimated by the following Formula (3).

$$\lambda = L * 4 * n/m \quad (3)$$

where, $\lambda$ is the resonance wavelength, L is a membrane thickness, n is a refractive index at a calculated wavelength and m is any chosen natural number.

The solar light spectrum is present generally in the range from 300 to 4000 nm, and on the long wavelength side longer than 400 nm, the solar light intensity (light energy) is high. Whereas, the light in the ultraviolet radiation range from 300 to 400 nm corresponds to the "tail" of the solar light spectrum, thus its energy is not high.

Therefore, absorption of light on the short wavelength side shorter than 400 nm is allowable in designing of the radiant cooling material. Namely, the thickness of the nitride membrane may be designed so that the maximum resonance wavelength (wavelength when m=1) is present on the shorter wavelength side equal to or less than 400 nm (see Formula (4) below).

$$L < \lambda/(4*n) = 400/n_{400nm}/4 \quad (4)$$

where, $n_{400\ nm}$ is the refractive index when the wavelength is 400 nm.

And, when the maximum resonance wavelength is equal to or less than 400 nm, cooling under sunshine is still possible. Preferably, however, an arrangement that does not increase absorption of ultraviolet light will provide better cooling effect. Therefore, the designing should be made such that the resonance wavelength is present on the shorter wavelength side equal to or less than 300 nm.

In short, it is particularly preferred that the thickness satisfy the condition:

$$L < \lambda/(4*n) = 300/n_{300\ nm}/4.$$

Next, there will be explained an exemplary case where the transparent nitride membrane comprises silicon nitride ($Si_2N_3$).

In the case of silicon nitride: $n_{400\ nm}=2.1$ and $n_{300\ nm}=2.17$. Therefore, in the case of silicon nitride, membrane thickness equal to or less than 47 nm is preferred, more preferably, equal to or less than 34 nm.

Figure 23:
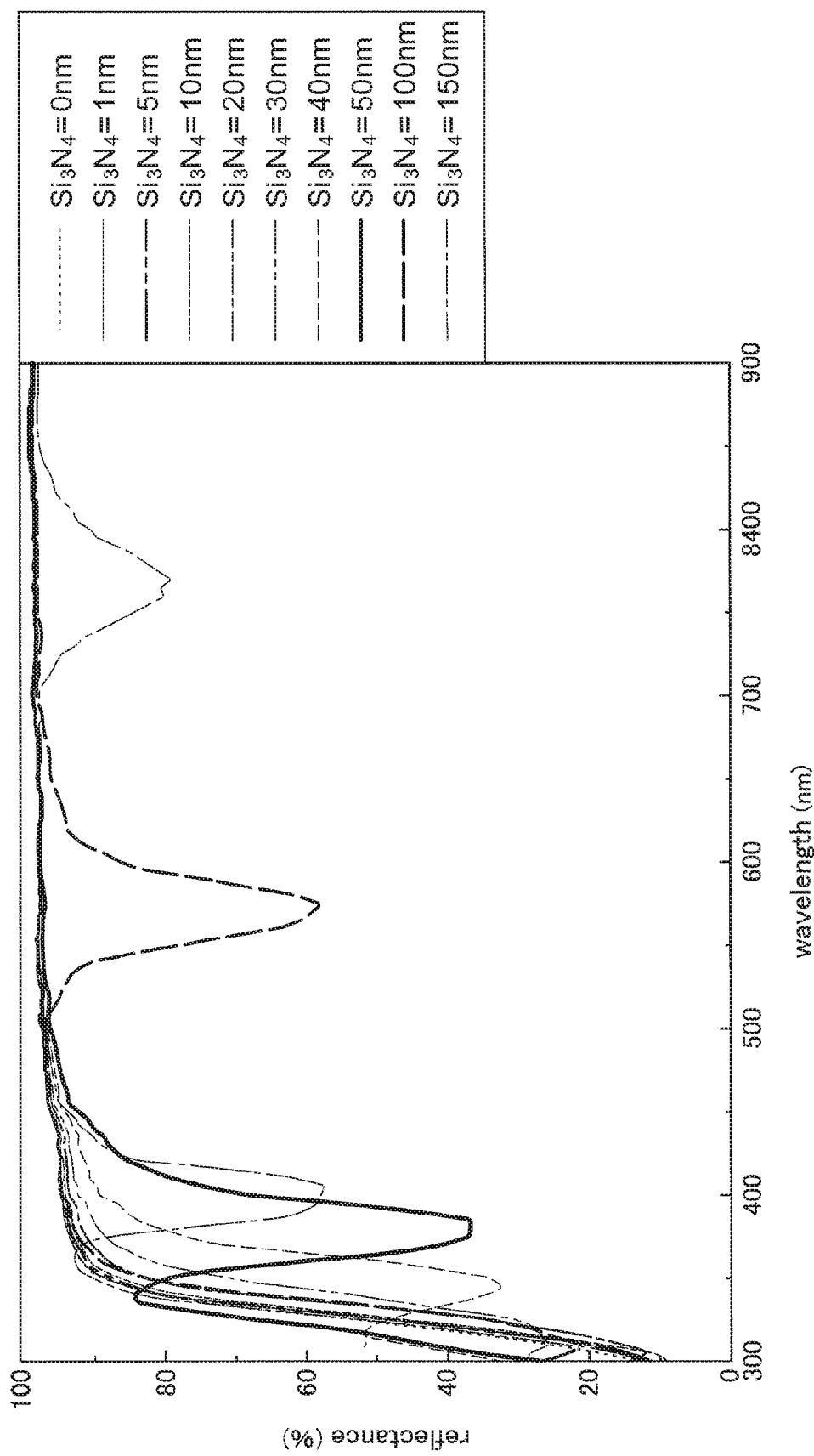
FIG. 23 is a view showing changes in the reflectance when the thickness of a transparent nitride membrane is varied.
Figure 24:
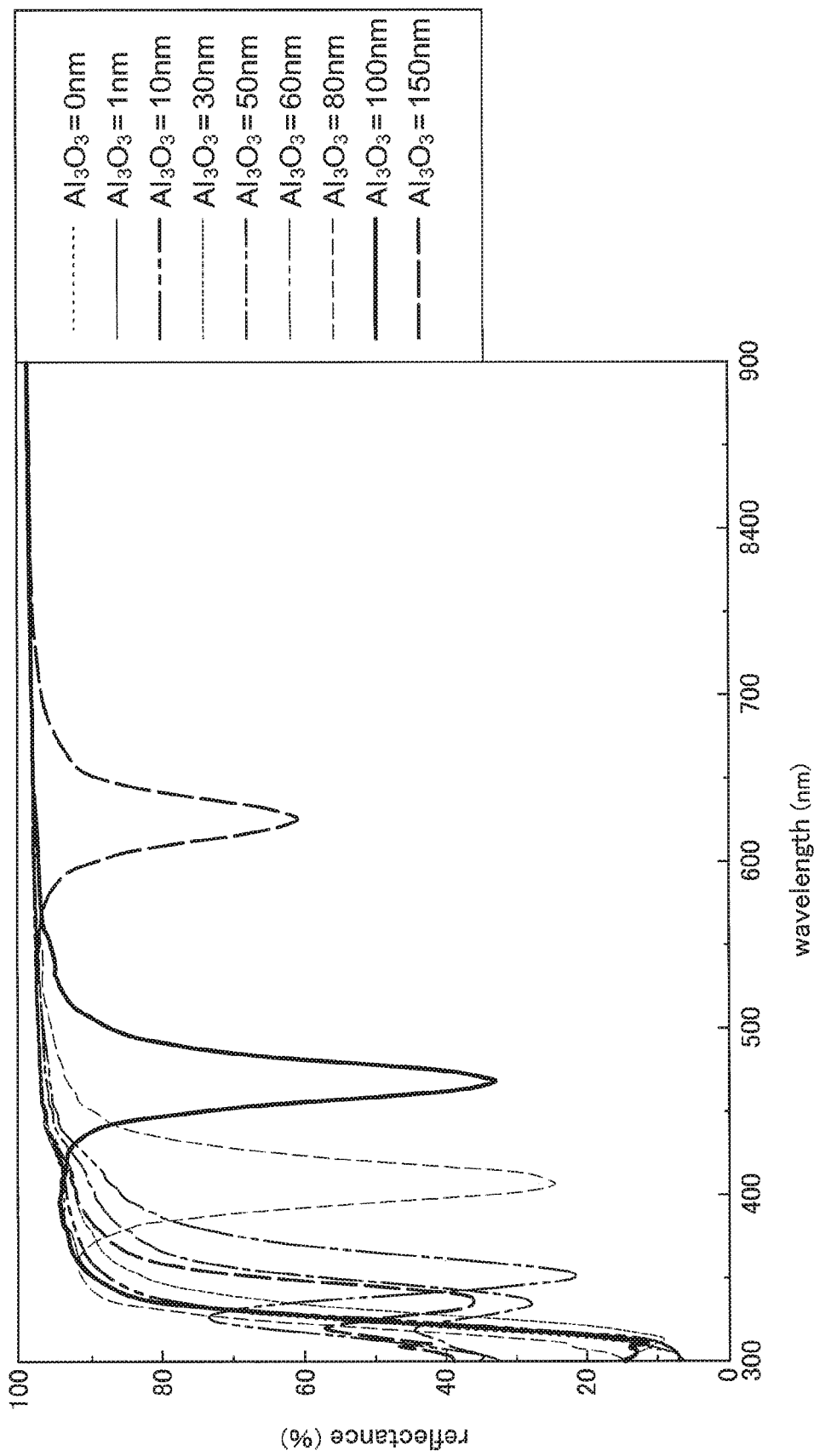
FIG. 24 is a view showing changes in the reflectance when the thickness of a transparent oxide membrane is varied.

FIG. 23 and FIG. 24 are views showing reflectances of the light reflective layer B when the thickness of $Si_3N_4$ as a transparent nitride membrane or $Al_2O_3$ as a transparent oxide membrane was varied in the case in which the radiant cooling device CP was configured such that the infrared radiative layer A was formed as TEMPAX having thickness of 1 mm, the first layer B1 of the light reflective layer B was formed as silver membrane having a membrane thickness of 50 nm, the second layer B2 of the light reflective layer B was formed as aluminum membrane having a membrane thickness of 50 nm, the gapless contact layer 3 was formed as an aluminum oxide ($Al_2O_3$) membrane having a membrane thickness of 5 nm, the anti-oxidization layer 4 was formed as a silicon dioxide ($SiO_2$) membrane having a membrane thickness of 30 nm and the anti-alloying transparent layer B3 was included in the light reflective layer B (see FIG. 2).

Namely, as shown in FIG. 23, when the membrane thickness of silicon nitride ($Si_3N_4$) is 50 nm (~47 nm), absorption by the plasmon resonance appears on the shorter wavelength side slightly shorter than 400 nm. When the membrane thickness of silicon nitride becomes 30 nm (~34 nm), the absorbance due to the plasmon resonance becomes less conspicuous as being concealed by the inherent absorbance of silver near 300 nm. Namely, with implementation of the desirable arrangement described above, the presence of the transparent nitride membrane formed of silicon nitride ($Si_3N_4$) does not contribute to the solar light absorption.

The transparent oxide membrane differs greatly in the refractive index from the transparent nitride membrane. If the transparent oxide membrane comprises aluminum oxide ($Al_2O_3$), $n_{400\ nm}$ is 1.67 and $n_{300\ nm}$ is 1.70.

Therefore, with calculations of the resonance wavelengths are done, as shown in FIG. 24, in the case of the transparent oxide membrane being aluminum oxide ($Al_2O_3$), the membrane thickness is preferably equal to less than 60 nm, more preferably equal to or less than 44 nm.

Incidentally, in consideration to the viewpoint of preventing peeling-off due to a shearing stress attributable to a difference of thermal expansion rates of materials, the smaller the thickness (membrane thickness) of the anti-alloying transparent layer B3, the better.

Other Embodiments

Next, other embodiments will be recited on after another.

(1) In the foregoing embodiment, there was disclosed the exemplary case in which the first layer B1, the anti-alloying transparent layer B3 and the second layer B2 are stacked on the infrared radiative layer A as a substrate. Alternatively, on a substrate different from the infrared radiative layer A, the second layer B2, the anti-alloying transparent layer B3 and the first layer B1 may be stacked to form the light reflective layer B, with the infrared radiative layer A and the light reflective layer B being superposed each other. In this case, a certain gap may be present as long as it is still capable of heat conduction, between the infrared radiative layer A and the light reflective layer B.

(2) In the foregoing embodiment, there was disclosed the exemplary case of the anti-oxidization layer 4 being provided. However, in case e.g. the membrane thickness (thickness) of the second layer B2 formed of aluminum is sufficiently large, the anti-oxidization layer 4 may be omitted.

(3) In the foregoing embodiment, detailed explanation was made on the case of forming the first layer B1 of silver. However, the membrane thickness (thickness) in the case of forming the first layer B1 of a silver alloy may be about same as the membrane thickness (thickness) of the case of forming the first layer B1 of silver.

(4) In the foregoing embodiment, detailed explanation was made on the case of forming the second layer B2 of aluminum. However, the membrane thickness (thickness) in the case of forming the second layer B2 of an aluminum alloy may be about same as the membrane thickness (thickness) of the case of forming the second layer B2 of aluminum.

Incidentally, the arrangements disclosed in the foregoing embodiment (including the other embodiments, same hereinafter) may be used in any combination with the arrangement(s) disclosed in the other embodiments as long as no contradiction results from such combination. Further, the embodiments disclosed in this detailed disclosure are only exemplary, and embodiments of the present invention are not limited thereto, but various changes and modifications will be possible in a range not deviating from the object of the present invention.

DESCRIPTION OF SINGS

3: gapless contact layer
4: anti-oxidization layer
A: infrared radiative layer
B: light reflective layer
B1: first layer
B2: second layer
B3: anti-alloying transparent layer

The invention claimed is:

1. A radiative cooling device comprising an infrared radiative layer for radiating infrared light from a radiative surface and a light reflective layer disposed on the infrared radiative layer on the side of the infrared radiative layer opposite the radiative surface of the infrared radiative layer,
wherein the light reflective layer comprises a first metal layer made of silver or silver alloy, a second metal layer made of aluminum or aluminum alloy and an anti-alloying transparent layer for preventing alloying between silver and aluminum stacked in the order of the first metal layer, the anti-alloying transparent layer and the second metal layer with the first metal layer closest to the infrared radiative layer.

2. The radiative cooling device of claim 1, wherein the first metal layer has a thickness greater than 3.3 nm and equal to or less than 100 nm.

3. The radiative cooling device of claim 1, wherein the thickness of the first metal layer is equal to or greater than 50 nm and equal to or less than 100 nm.

4. The radiative cooling device of claim 1, wherein the second metal layer has a thickness equal to or greater than 10 nm.

5. The radiative cooling device of claim 1, wherein the infrared radiative layer comprises glass selected from the group consisting of alkali free glass, crown glass and borosilicate glass.

6. The radiative cooling device of claim 1, wherein the infrared radiative layer is used as a substrate, on which the first metal layer, the anti-alloying transparent layer and the second metal layer are stacked.

7. The radiative cooling device of claim 6, wherein a gapless contact layer is stacked between the infrared radiative layer and the first metal layer.

8. The radiative cooling device of claim 6, wherein on the side of the second metal layer opposite the anti-alloying transparent layer, an anti-oxidization layer is stacked.

9. The radiative cooling device of claim 1, wherein the anti-alloying transparent layer comprises a transparent nitride membrane.

10. The radiative cooling device of claim 1, wherein the anti-alloying transparent layer comprises a transparent oxide membrane.

11. The radiative cooling device of claim 1, wherein the anti-alloying transparent layer has a thickness providing, as a resonant wavelength, any wavelength equal to or less than 400 nm.

12. The radiative cooling device of claim 1, wherein the anti-alloying transparent layer has a thickness providing, as a resonant wavelength, any wavelength equal to or less than 300 nm.

* * * * *